(12) United States Patent
Nilsson et al.

(10) Patent No.: US 10,054,023 B2
(45) Date of Patent: Aug. 21, 2018

(54) EXHAUST TREATMENT SYSTEM AND METHOD FOR TREATMENT OF AN EXHAUST STREAM

(71) Applicant: Scania CV AB, Södertälje (SE)

(72) Inventors: Magnus Nilsson, Ärsta (SE); Henrik Birgersson, Stockholm (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 15/314,441

(22) PCT Filed: Feb. 27, 2015

(86) PCT No.: PCT/SE2015/050220
§ 371 (c)(1),
(2) Date: Nov. 28, 2016

(87) PCT Pub. No.: WO2015/130211
PCT Pub. Date: Sep. 3, 2015

(65) Prior Publication Data
US 2017/0152780 A1      Jun. 1, 2017

(30) Foreign Application Priority Data

Feb. 28, 2014  (SE) ...................................... 1450229
Feb. 28, 2014  (SE) ...................................... 1450230

(51) Int. Cl.
*F01N 3/20*        (2006.01)
*B01D 46/00*       (2006.01)
(Continued)

(52) U.S. Cl.
CPC ......... *F01N 3/208* (2013.01); *B01D 46/0027* (2013.01); *B01D 46/0061* (2013.01);
(Continued)

(58) Field of Classification Search
CPC ................ B01D 53/94; B01D 53/9409; B01D 53/9418; B01D 53/944; B01D 2257/402;
(Continued)

(56) References Cited

U.S. PATENT DOCUMENTS 5,120,695 A   6/1992  Blumrich et al.
5,239,860 A   8/1993  Harris et al.
(Continued)

FOREIGN PATENT DOCUMENTS

CN    201513221 U    6/2010
DE    3733501 A1     4/1989
(Continued)

OTHER PUBLICATIONS

Botar-Jid, Claudiu Cristian (2007)—Selective catalytic reduction of nitrogen oxides with ammonia in forced unsteady state reactors—Case based reasoning and mathematical model simulation reasoning; Retrieved online from http:// urn.fi/URN:ISBN:978-952-214-469-0; p. 3, second paragraph.
(Continued)

*Primary Examiner* — Timothy C Vanoy
(74) *Attorney, Agent, or Firm* — Moore & Van Allen PLLC; W. Kevin Ransom

(57) ABSTRACT

An exhaust treatment system comprising: a first dosage device, arranged to supply a first additive into said exhaust stream; a first reduction catalyst device, downstream of said first dosage device arranged for reduction of nitrogen oxides in said exhaust stream through the use of said first additive; a particulate filter, at least partly comprising a catalytically oxidizing coating, which is downstream of said first reduction catalyst device to catch soot particles, and to oxidize one or several of nitrogen oxide and incompletely oxidized carbon compounds in said exhaust stream; a second dosage device, downstream of said particulate filter to supply a
(Continued)

second additive into said exhaust stream; and a second reduction catalyst device, downstream of said second dosage device for a reduction of nitrogen oxides in said exhaust stream, with the use of at least one of said first and said second additive.

36 Claims, 6 Drawing Sheets

(51) Int. Cl.
  *F01N 13/00* (2010.01)
  *B01D 53/94* (2006.01)
  *F01N 3/035* (2006.01)
  *F01N 11/00* (2006.01)

(52) U.S. Cl.
  CPC ..... *B01D 53/9418* (2013.01); *B01D 53/9495* (2013.01); *F01N 3/035* (2013.01); *F01N 11/002* (2013.01); *F01N 13/009* (2014.06); *F01N 13/0093* (2014.06); *B01D 2279/30* (2013.01); *F01N 2510/06* (2013.01); *F01N 2610/02* (2013.01); *F01N 2610/144* (2013.01); *F01N 2900/14* (2013.01)

(58) Field of Classification Search
  CPC ........ B01D 2257/404; B01D 2258/012; F01N 3/035; F01N 3/106; F01N 3/108; F01N 3/206; F01N 2250/02; F01N 2610/02; F01N 2900/00; F01N 2900/1806; F01N 3/2066
  See application file for complete search history.

(56) References Cited

U.S. PATENT DOCUMENTS

| | | | |
|---|---|---|---|
| 7,559,194 B2 | 7/2009 | Westerberg | |
| 8,544,260 B2* | 10/2013 | Boorse | F01N 3/035 60/273 |
| 9,670,855 B2 | 6/2017 | Dickson et al. | |
| 2004/0040289 A1 | 3/2004 | Mazur et al. | |
| 2004/0098979 A1 | 5/2004 | Hammerle et al. | |
| 2005/0069476 A1 | 3/2005 | Blakeman et al. | |
| 2005/0232830 A1 | 10/2005 | Bruck | |
| 2006/0039843 A1 | 2/2006 | Patchett et al. | |
| 2007/0150154 A1 | 6/2007 | Lenz | |
| 2008/0008629 A1 | 1/2008 | Doring et al. | |
| 2008/0060348 A1* | 3/2008 | Robel | B01D 53/9431 60/295 |
| 2009/0035194 A1* | 2/2009 | Robel | F01N 3/0231 422/177 |
| 2009/0035195 A1* | 2/2009 | Robel | F01N 3/0231 422/177 |
| 2010/0024393 A1 | 2/2010 | Chi et al. | |
| 2010/0050604 A1 | 3/2010 | Hoard et al. | |
| 2010/0252737 A1 | 10/2010 | Fournel et al. | |
| 2010/0319320 A1 | 12/2010 | Mital et al. | |
| 2011/0085954 A1 | 4/2011 | Doring et al. | |
| 2011/0113759 A1 | 5/2011 | Tilinski et al. | |
| 2011/0211193 A1 | 9/2011 | Saveliev et al. | |
| 2011/0271664 A1 | 11/2011 | Boorse et al. | |
| 2011/0295484 A1 | 12/2011 | L'Henoret | |
| 2011/0313635 A1 | 12/2011 | Blanc et al. | |
| 2012/0117954 A1 | 5/2012 | Yasui et al. | |
| 2012/0255286 A1 | 10/2012 | Matsunaga et al. | |
| 2013/0078173 A1 | 3/2013 | Cox | |
| 2013/0202507 A1 | 8/2013 | Echoff et al. | |
| 2013/0232953 A1 | 9/2013 | Harmsen et al. | |
| 2013/0232958 A1 | 9/2013 | Ancimer et al. | |
| 2013/0289857 A1 | 10/2013 | Schmitt et al. | |
| 2014/0052353 A1 | 2/2014 | Sujan et al. | |
| 2014/0056789 A1 | 2/2014 | Mussmann et al. | |
| 2014/0229010 A1 | 8/2014 | Farquharson et al. | |
| 2015/0131093 A1 | 5/2015 | Saptari | |
| 2015/0337702 A1* | 11/2015 | Ettireddy | B01D 53/9477 60/297 |
| 2016/0166990 A1 | 6/2016 | Phillips et al. | |

FOREIGN PATENT DOCUMENTS

| | | | |
|---|---|---|---|
| DE | 102006031650 A1 | 1/2008 | |
| DE | 102008026191 A1 | 1/2009 | |
| DE | 102009038835 A1 | 3/2011 | |
| DE | 102010050312 A1 | 5/2012 | |
| DE | 102012201809 A1 | 9/2012 | |
| DE | 202013101028 U1 | 5/2013 | |
| DE | 102015015260 A1 * | 6/2017 | ............ F01N 3/021 |
| EP | 1181531 A1 | 2/2002 | |
| EP | 2390480 A1 | 11/2011 | |
| KR | 20140143145 A * | 12/2014 | ............ B01D 53/90 |
| RU | 2354833 C2 | 5/2009 | |
| WO | 2007104382 A1 | 9/2007 | |
| WO | 2009017639 A1 | 2/2009 | |
| WO | 2012037342 A1 | 3/2012 | |
| WO | 2013022516 A1 | 2/2013 | |
| WO | 2013095214 A1 | 6/2013 | |
| WO | WO 2013 095214 A1 * | 6/2013 | ............ F01N 3/106 |
| WO | 2013100846 A1 | 7/2013 | |
| WO | 2014016616 A1 | 1/2014 | |
| WO | 2014149297 A1 | 9/2014 | |

OTHER PUBLICATIONS

International Search Report for PCT/SE15/050220 dated Jun. 24, 2015.
Written Opinion of the International Searching Authority for PCT/SE15/050220 dated Jun. 24, 2015.
NOx Controls; EPA/452/B-02-001 Section 4—Retrieved online on Jun. 5, 2015 from http://www.epa.gov/ttncatc1/dir1/cs4-2ch2.pdf; pp. 2-6, third paragraph.
European Search Report for European Patent Application No. 15755231.6 dated Jan. 29, 2018.
European Search Report for European Patent Application No. PCT/SE2015050220 dated Jan. 29, 2018.

* cited by examiner

EXHAUST TREATMENT SYSTEM AND METHOD FOR TREATMENT OF AN EXHAUST STREAM

CROSS-REFERENCE TO RELATED APPLICATION(S)

This application is a national stage application (filed under 35 § U.S.C. 371) of PCT/SE15/050220, filed Feb. 27, 2015 of the same title, which, in turn claims priority to Swedish Application Nos. 1450229-8 and 1450230-6, both filed Feb. 28, 2014 of the same title; the contents of each of which are hereby incorporated by reference.

FIELD OF THE INVENTION

The present invention relates to an exhaust treatment system, method, and computer program product for treatment of an exhaust stream.

BACKGROUND OF THE INVENTION

The following background description constitutes a description of the background to the present invention, and thus need not necessarily constitute prior art.

In connection with increased government interests concerning pollution and air quality, primarily in urban areas, emission standards and regulations regarding emissions from combustion engines have been drafted in many jurisdictions.

Such emission standards often consist of requirements defining acceptable limits of exhaust emissions from combustion engines in for example vehicles. For example, emission levels of nitrogen oxides $NO_x$, hydrocarbons $C_xH_y$, carbon monoxide CO and particles PM are often regulated by such standards for most types of vehicles. Vehicles equipped with combustion engines typically give rise to such emissions in varying degrees. In this document, the invention will be described mainly for its application in vehicles. However, the invention may be used in substantially all applications where combustion engines are used, for example in vessels such as ships or aeroplanes/helicopters, wherein regulations and standards for such applications limit emissions from the combustion engines.

In an effort to comply with these emission standards, the exhausts caused by the combustion of the combustion engine are treated (purified).

A common way of treating exhausts from a combustion engine consists of a so-called catalytic purification process, which is why vehicles equipped with a combustion engine usually comprise at least one catalyst. There are different types of catalysts, where the different respective types may be suitable depending on for example the combustion concept, combustion strategies and/or fuel types which are used in the vehicles, and/or the types of compounds in the exhaust stream to be purified. In relation to at least nitrous gases (nitrogen monoxide, nitrogen dioxide), referred to below as nitrogen oxides $NO_x$, vehicles often comprise a catalyst, wherein an additive is supplied to the exhaust stream resulting from the combustion in the combustion engine, in order to reduce nitrogen oxides $NO_x$, primarily to nitrogen gas and aqueous vapor. This is described in more detail below.

SCR (Selective Catalytic Reduction) catalysts are a commonly used type of catalyst for this type of reduction, primarily for heavy goods vehicles. SCR catalysts usually use ammonia $NH_3$, or a composition from which ammonia may be generated/formed, as an additive to reduce the amount of nitrogen oxides $NO_x$ in the exhausts. The additive is injected into the exhaust stream resulting from the combustion engine upstream of the catalyst. The additive added to the catalyst is adsorbed (stored) in the catalyst, in the form of ammonia $NH_3$, so that a redox-reaction may occur between nitrogen oxides $NO_x$ in the exhausts and ammonia $NH_3$ available via the additive.

A modern combustion engine is a system where there is cooperation and mutual impact between the engine and the exhaust treatment. Specifically, there is a correlation between the exhaust treatment system's ability to reduce nitrogen oxides $NO_x$ and the fuel efficiency of the combustion engine. For the combustion engine, there is a correlation between the engine's fuel efficiency/total efficiency and the nitrogen oxides $NO_x$ produced by it. This correlation specifies that for a given system there is a positive correlation between nitrogen oxides $NO_x$ produced and fuel efficiency, in other words an engine that is permitted to emit more nitrogen oxides $NO_x$ may be induced to consume less fuel by way of, for example, a more optimal selection of the injection timing, which may yield a higher combustion efficiency. Similarly, there is often a negative correlation between a produced particle mass PM and the fuel efficiency, meaning that an increased emission of particle mass PM from the engine is connected with an increased fuel consumption. This correlation is the background to the widespread use of exhaust treatment systems comprising an SCR-catalyst, where the intention is the optimization of the engine regarding fuel consumption and emission of particles, towards a relatively larger amount of nitrogen oxides $NO_x$ produced. A reduction of these nitrogen oxides NO is then carried out in the exhaust treatment system, which thus may also comprise an SCR catalyst. Through an integrated approach in the design of the engine and exhaust treatment system, where the engine and exhaust treatment complement each other, a high fuel efficiency may therefore be achieved jointly with low emissions of both particles PM as well as nitrogen oxides $NO_x$.

SUMMARY OF THE INVENTION

To some extent, the performance of the exhaust treatment system may be enhanced by increasing the substrate volumes comprised in the exhaust treatment system, which in particular reduces losses due to uneven distribution of the exhaust flow through the substrate. At the same time, a larger substrate volume provides a greater back pressure, which may counteract gains in fuel efficiency due to the higher conversion degree. Larger substrate volumes also entail an increased cost. It is thus important to be able to use the exhaust treatment system optimally, for example by avoiding oversizing and/or by limiting the exhaust treatment system's spread in terms of size and/or manufacturing cost.

The function and efficiency for catalysts in general, and for reduction catalysts in particular, is strongly dependent on the temperature over the reduction catalyst. The term "temperature over the reduction catalyst" as used herein, means the temperature in/at/for the exhaust stream through the reduction catalyst. The substrate will assume this temperature due to its heat exchanging ability. At a low temperature over the reduction catalyst, the reduction of nitrogen oxides NO is typically ineffective. The $NO_2/NO_x$ fraction in the exhausts provides a certain potential for increasing the catalytic activity, also at lower exhaust temperatures. The temperature and the $NO_2/NO_x$ fraction over the reduction catalyst are, however, generally difficult to control, since they to a great extent depend on a number of factors, such as how the driver drives the vehicle. For example, the temperature over the reduction catalyst depends on the torque requested by a driver and/or by a cruise control, on the appearance of the road section in which the vehicle is located, and/or the driving style of the driver.

Prior art exhaust treatment systems, such as the system described in detail below, which many producers have used to meet the emission standard Euro VI (hereafter referred to as the "Euro VI-system"), comprising an oxidation catalyst, a diesel particulate filter and a reduction catalyst, have problems relating to the large thermal mass/inertia of the catalysts/filters and the large thermal mass/inertia of the rest of the exhaust treatment system, comprising for example exhaust pipes, silencers and various connections. At for example cold starts, where both the engine and the exhaust treatment system are cold, and at throttle from low exhaust temperatures, where more torque than previously is requested, for example when easy city driving turns into highway driving, or after idling and power take-off, it is primarily the diesel particulate filter's large thermal mass/inertia that causes the temperature of the reduction catalyst to increase only slowly in such prior art exhaust treatment systems. Thus, at for example cold starts and at vehicle operation with temperature- and/or flow transient elements, the function of the reduction catalyst deteriorates, and accordingly the reduction of nitrogen oxides $NO_x$ also deteriorates. This deterioration may result in a poor exhaust purification, risking unnecessary pollution of the environment. Additionally, because of the deterioration of the reduction catalyst's function, the risk of not achieving the regulatory requirements relating to exhaust purification increases. Fuel consumption may also be adversely impacted by the deteriorating function, since fuel energy may then need to be used in order to increase the temperature and efficiency of the reduction catalyst via different temperature increasing measures.

One objective of the present invention is to improve the purification of exhausts in an exhaust treatment system, while improving the conditions for achieving a higher fuel efficiency.

Through the use of the present invention a more temperature efficient treatment of the exhausts is achieved, since the first reduction catalyst device fitted upstream in the exhaust treatment system according to the invention may, in some operating modes, operate at more favorable temperatures than the temperatures of the second reduction catalyst device fitted downstream. For example, at cold starts and throttle from low temperatures, the first reduction catalyst device sooner reaches operating temperatures, at which an efficient reduction of nitrogen oxides $NO_x$ is obtained. Thus, according to the invention the available heat is used in a more energy efficient manner, resulting in an earlier and/or more efficient reduction of nitrogen oxides $NO_x$, for example at cold starts and at throttle from low exhaust temperatures, than what would have been possible with the above described prior art exhaust treatment systems.

At certain other operating modes, similarly, the second reduction catalyst device fitted downstream may operate at more favorable temperatures than the temperatures of the first reduction catalyst device fitted upstream.

Through the use of the invention different thermal inertias are obtained for the first and the second reduction catalyst device, meaning that these first and second reduction catalyst devices may be optimized differently with respect to activity and selectivity. Thus, the first and second reduction catalyst devices may be optimized from a system perspective, that is to say from a perspective relating to the entire exhaust treatment system's function, and may therefore be used to provide an overall more efficient purification of the exhausts than what the separate optimized catalysts would have been able to provide. Such optimization of the first and second reduction catalyst devices according to the invention may be used to provide this overall more efficient purification at for example cold start, but also at substantially all vehicle operation, since the temperature- and/or flow transient elements often occur also at normal vehicle operation. As mentioned above, the invention may also be used for exhaust purification in other units than vehicles, such as in different types of vessels, where an overall more efficient purification of the exhausts from the unit is obtained.

The present invention uses the thermal inertia/mass of the particulate filter to the function's advantage, by optimizing the function for both the first and the second reduction catalyst devices, based on this inertia. Accordingly, through the present invention a cooperation/symbiosis is obtained between the first reduction catalyst device, which is optimized for the first thermal mass and the first temperature function/temperature process to which it is exposed, and the second reduction catalyst device, which is optimized for the second thermal mass and the second temperature process to which it is exposed.

The first reduction catalyst device and/or the second reduction catalyst device may thus be optimized based on characteristics, for example catalytic characteristics, for the second reduction catalyst device and/or the first reduction catalyst device. For example, the second reduction catalyst device may be construed/selected so that its catalytic characteristics at low temperatures become less efficient, facilitating that its catalytic characteristics at high temperatures may be optimized. If these catalytic characteristics of the second reduction catalyst device are taken into account, the first reduction catalyst device's catalytic characteristics may then be optimized in such a way that it need not be as efficient at high temperatures.

These possibilities of optimizing the first reduction catalyst device and/or the second reduction catalyst device mean that the present invention provides an exhaust purification which is suitable for emissions arising at substantially all types of driving modes, especially for highly transient operation, which results in a variable temperature- and/or flow profile. Transient operation may, for example, comprise relatively many starts and brakes of the vehicle, or relatively many uphill and downhill slopes. Since relatively many vehicles, such as for example buses that often stop at bus stops, and/or vehicles driven in urban traffic or hilly topography, experience such transient operation, the present invention provides an important and very useful exhaust purification, which overall reduces the emissions from the vehicles in which it is implemented.

The present invention thus uses the previously problematic thermal mass and heat exchange in, primarily, the particulate filter in the Euro VI-system as a positive characteristic. The exhaust treatment system according to the present invention may, similarly to the Euro VI-system, contribute with heat to the exhaust stream and the reduction catalyst device fitted downstream for brief dragging periods, or other low temperature operation, if such low temperature operation was preceded by operation with higher operating temperatures. Due to its thermal inertia, the particulate filter at this point is warmer than the exhaust stream, and accordingly the exhaust stream may be heated by the particulate filter.

Additionally, this good characteristic is complemented by the fact that the reduction catalyst device placed upstream may, especially at transient operation, use the higher temperature arising in connection with throttle. Thus, the first reduction catalyst device experiences a higher temperature after the throttle, than what the second reduction catalyst device experiences. Such higher temperature for the first reduction catalyst device is used by the present invention in order to improve the $NO_x$-reduction of the first reduction catalyst device. The present invention, which uses two reduction catalyst devices, may use both these positive characteristics by adding a possibility for $NO_x$-reduction with a small thermal inertia, that is to say the exhaust treatment system according to the invention comprises both a $NO_x$-conversion upstream of a large thermal inertia, and a $NO_x$-conversion downstream of a large thermal inertia. The exhaust treatment system according to the present invention may then, in an energy efficient manner, use available heat to a maximum, meaning that the rapid and "unfiltered" heat experienced by the reduction catalyst device placed upstream may also be used to make the exhaust treatment system according to the invention efficient.

The exhaust treatment system according to the present invention has potential to meet the emission requirements in the Euro VI emission standard. Additionally, the exhaust treatment system according to the present invention has potential to meet the emission requirements in several other existing and/or future emission standards.

The exhaust treatment system according to the present invention may be made compact, since it comprises, in relation to the performance/purification degree which it may deliver, few units in the exhaust treatment system. These relatively few units need not, for a balanced exhaust treatment system according to the present invention, have a large volume. Since the number of units, and the size of these units, is minimized by the present invention, the exhaust back pressure may also be limited, which entails a lower fuel consumption for the vehicle. Catalytic performance per substrate volume unit may be exchanged for a smaller substrate volume, in order to obtain a certain catalytic purification. For an exhaust purification device with a predetermined size, and/or a predetermined external geometry, which is often the case in vehicles with limited space for the exhaust treatment system, a smaller substrate volume means that a larger volume within the predetermined size of the exhaust purification may be used for distribution, mixture and turnings of the exhaust stream within the exhaust purification device. This means that the exhaust back pressure may be reduced for an exhaust purification device with a predetermined size and/or a predetermined external geometry, if the performance per substrate volume unit is increased. Thus, the total volume of the exhaust treatment system according to the invention may be reduced, compared with at least some prior art systems. Alternatively, the exhaust back pressure may be reduced with the use of the present invention.

At the use of the present invention, the need for an exhaust gas recirculation system (Exhaust Gas Recirculation; EGR) may also be reduced or eliminated. A reduction of the need to use an exhaust gas recirculation system has advantages, among others relating to robustness, gas exchange complexity and power output.

At new production of vehicles, the system according to the present invention may be fitted easily at a limited cost, since the separate oxidation catalyst DOC, that is to say the separate substrate for the oxidation catalyst DOC, and the installation of such substrate which existed in prior art systems, is exchanged for the first reduction catalyst device according to the present invention at manufacture. Retrofitting of an exhaust treatment system according to the present invention may also be carried out easily, since the oxidation catalyst DOC, which was present in prior art systems, may also be replaced with the first reduction catalyst device according to the present invention in already produced vehicles. An additional dosage device will be required. It may also be needful to replace the particulate filter or to adjust the characteristics of its catalytic coating. In order to achieve a sufficient nitrogen dioxide based ($NO_2$-based) soot oxidation, the engine's ratio between nitrogen oxides and soot ($NO_x$/soot-ratio), and the control of the reductant dosage, effected with the first dosage device, fitted upstream in the exhaust treatment system according to the invention, may need to fulfil certain criteria.

The oxidizing coating, for example comprising precious metal, which in Euro VI-systems is located in the oxidation catalyst DOC, may according to one embodiment of the invention at least partly be implemented, for example, in the diesel particulate filter DPF, whereat conditions for a sufficient $NO_2$-based soot oxidation may be obtained. Thus, a compact design of the exhaust treatment system according to the invention is obtained. Through the use of a diesel particulate filter DPF with oxidation catalyst characteristics, an increased predictability for the formation of nitrogen dioxides $NO_2$ may also be obtained. This is due to the fact that deactivation of the catalytically active seats, such as for example deactivation caused by phosphorus, often has an axial concentration gradient. This means that catalysts with a relatively brief physical length may be more sensitive to these intoxications, than catalysts with a larger physical length. Where for example precious metal, such as platinum, is placed on the physically long diesel particulate filter DPF, instead of on the physically shorter first oxidation catalyst DOC, more stable levels of nitrogen dioxide $NO_2$ may potentially be obtained over time.

According to one embodiment of the present invention, the first reduction catalyst device constitutes an, at least partly, protective substrate upstream of an oxidizing coating, wherein the oxidizing coating may be comprised in a particulate filter, coated with for example a precious metal. The catalytic coating for the first reduction catalyst device may, according to one embodiment, be selected to be robust in withstanding chemical poisoning, which may, over time, provide a more stable level for the ratio between nitrogen dioxide and nitrogen oxides $NO_2/NO_x$ reaching the second reduction catalyst device. The catalytic coating protected may also, according to one embodiment, be comprised in a so-called combicat, which is described in more detail below.

The present invention also has an advantage in that two cooperating dosage devices are used in combination for the dosage of a reductant, for example urea, upstream of the first and second reduction catalyst devices, which relieves and facilitates mixture and potential evaporation of the reductant, since the injection of the reductant is divided between two physically separate positions. This reduces the risk of the reductant cooling down the exhaust treatment system locally, which may potentially form deposits at the positions where the reductant is injected, or downstream of such positions.

The relief of vaporization of the reductant means that the exhaust back pressure may potentially be reduced, since the requirement for $NO_x$-conversion per reduction step is reduced, so that the amount of reductant that must be vaporized is also reduced, since the injection of the reductant is divided between two positions, compared to the previous single dosage position. It is also possible, with the present invention, to reduce, or to completely shut off dosage in one dosage position, and then to remove potential precipitates that may arise, using heat. Accordingly, for example a larger dosage amount (a more ample dosage) may be allowed in the first dosage position for the first reduction catalyst device, since potential precipitates may be removed with heat at the same time as the emission requirements are met by the second reduction catalyst device during this time. This larger/more ample dosage may be viewed as a more aggressive dosage, providing dosage amounts closer to/above a dosage threshold value at which a risk of precipitates/crystallisations of additive arises.

A non-limiting example may be that, if the single dosage device in the Euro VI-system had been optimized to provide a vaporization and a distribution of the reductant providing a 98% $NO_x$-conversion, the $NO_x$-conversion of the two respective reduction catalyst devices in the exhaust treatment system according to the present invention may be reduced, for example to 60% and 95%, respectively. The amounts of reductant, which in this case have to be vaporized in the respective two positions become lower, and the allocations of reductant need not be as optimized in the system according to the invention as in the Euro VI-system. An optimal and homogeneous distribution of reductant, as required by the Euro VI-system, often results in a high exhaust back pressure, since an advanced vaporization/mixture must be used when the reductant is mixed with the exhausts, that is to say with the nitrogen oxides $NO_x$. Since the requirements for an optimal and homogeneous distribution of reductant are not as high in relation to the system according to the present invention, there is a possibility of reducing the exhaust back pressure when the present invention is used.

The two dosage positions used in the present invention thus facilitate that, overall, more additive may be supplied to the exhaust stream, than if only one dosage position had been used in the system. This means an improved performance may be provided.

The present invention thus provides a removal of load for the mixing and the potential vaporization. The double dosage positions mean, on the one hand, that the reductant is mixed and potentially vaporized in two positions, instead of in one position as in the Euro VI-system and, on the other hand, the double dosage positions mean that lower conversion levels, and thus a dosage with a less unfavorable ratio, may be used. The influence of the size of the conversion level and the ratio of the dosage is described in further detail below.

For embodiments which use additives in liquid form, the vaporization is also improved, when the system according to the invention is used. This is because, on the one hand, the total amount of additive to be supplied to the exhaust stream is split in two physically separate dosage positions and, on the other hand, the system may be loaded more heavily than systems with only one dosage position. The system may be loaded more heavily since the dosage in the position where residue of additive potentially arises may, where needed, be reduced/closed with the system according to the invention, while criteria for the total emissions simultaneously may be met.

The exhaust treatment system according to the present invention also provides for a robustness against errors in the dosage amounts of reductant. According to one embodiment of the present invention, an $NO_x$-sensor is placed between the two dosage devices in the exhaust treatment system. This means it is possible to correct a potential dosage error at the first dosage device, in connection with administration of a dose with the second dosage device.

Table 1 below shows a non-limiting example of conversion levels and emissions, which are the result of a 10% dosage error for the reductant in a case with 10 g/kWh $NO_x$. In the system with one reduction step, according to the example a 98% conversion of $NO_x$ is requested. In order to provide a 98% conversion of $NO_x$ in the exhaust treatment system with two reduction steps, a 60% conversion of $NO_x$ is requested for the first reduction catalyst device, and a 95% conversion of $NO_x$ is requested for the second reduction catalyst device. As illustrated in the table, a system with one reduction step, such as in the Euro VI-system, results in a 1.18 g/kWh emission. Two reduction steps, such as in a system according to the present invention, instead result in the emission of 0.67 g/kWh according to the example. This considerably lower resulting emission for the system according to the present invention is the mathematical result of the use of the two dosage points/reduction steps, as illustrated by Table 1. The $NO_x$-sensor placed between the two dosage devices provides for this possibility of correcting for the dosage error at the first dosage device, in connection with the dosage with the second dosage device.

TABLE 1

|  | Requested transformation ratio | Transformation ratio achieved with 10% dose inaccuracy | Emissions achieved [g/kWh] |
| --- | --- | --- | --- |
| One reduction step | 98% | 88.2% | 1.18 |
| Two reduction steps | 98% |  |  |
|  | Step 1 - 60% | 54.0% | 4.60 |
|  | Step 2 - 95% | 85.5% | 0.67 |

This embodiment may be implemented with a low level of added complexity, since an $NO_x$-sensor, which is already present in today's Euro VI-system, may be used in connection with the correction. The $NO_x$-sensor normally sits in the silencer inlet. Since the first reduction catalyst device and its first dosage in the present invention does not necessarily need to remove all nitrogen oxides $NO_x$ from the exhaust stream, the first reduction catalyst device, and its first dosage, may potentially cope without any measured information about nitrogen oxides $NO_x$ upstream of the first reduction catalyst device. However, it is important to obtain correct information, that is to say information with relatively high accuracy, about nitrogen oxides $NO_x$ upstream of the second reduction catalyst device, since the emissions in the second reduction catalyst device must be reduced to low levels, often to levels near zero. This position, i.e. the position at or upstream of the second reduction catalyst device, should therefore, according to one embodiment of the invention, suitably be equipped with a $NO_x$-sensor. Such $NO_x$-sensor may thus, according to the embodiment, be placed downstream of the particulate filter, which is also a less aggressive environment from a chemical poisoning perspective, compared to the environment upstream of the particulate filter.

Additionally, an adaptation/calibration of several $NO_x$-sensors in the exhaust treatment system may easily be carried out in the system according to the present invention, since the sensors may be subjected to the same $NO_x$-level, at the same time as the emission levels may be kept at reasonable levels during the adaptation/calibration. For the Euro VI-system, for example, the adaptation/calibration often entails that the emissions become too high during, and also partly after, the adaptation/calibration itself.

As mentioned above, the first and second reduction catalyst devices may be optimized individually, and with consideration of the entire exhaust treatment system's function, which may result in an overall very efficient purification of the exhausts. This individual optimization may also be used to reduce one or several of the volumes taken up by the first and second reduction catalyst devices, so that a compact exhaust treatment system is obtained.

For the above mentioned non-limiting example, where $NO_x$-conversion corresponding to the two respective dosage devices in the exhaust treatment system according to the present invention may constitute 60% or 95%, respectively, the exhaust treatment system according to the invention theoretically requires a total volume for the first and second reduction catalyst devices, equaling the size required of the reduction catalyst device in the Euro VI-system, to provide a $NO_x$-conversion representing 98% with only one reduction catalyst.

In practice, however, the Euro VI-system's requirement regarding the high 98% conversion level means that a larger catalyst volume is required than catalyst volumes representing the sum of the lower conversion levels 60% and 95%, respectively, according to the present invention's requirements. This is due to the non-linear relationship between volume and conversion level. At high conversion levels, such as for example 98%, imperfections in the distribution of exhausts and/or reductant impact the requirement for catalyst volume to a greater extent. High conversion levels also require a larger catalyst volume, since the high conversion levels result in a greater deposition/cover level of reductant on the catalyst surface. There is a risk that such deposited reductant may then desorb at some exhaust conditions, i.e. a so-called ammonia-slip may arise.

One example of the effect of the distribution of reductant and the effect of the increasing $NH_3$-slip is illustrated in FIG. 6. The figure shows that the ratio, that is to say the gradient/derivative, for the conversion level (y axis to the left) decreases in relation to stoichiometry (x axis) at high conversion levels, that is to say that the curve for the conversion level planes out for high conversion levels, which among others is due to imperfections in the distribution of exhausts and/or reductant. The figure also shows that an increase of $NH_3$-slip (y axis to the right) arises at higher conversion levels. At higher values than one (1) for the stoichiometry, more reductant is added than theoretically needed, which also increases the risk of $NH_3$-slip.

The present invention also facilitates, according to one embodiment, control of a ratio $NO_2/NO_x$, between the amount of nitrogen dioxide $NO_2$ and the amount of nitrogen oxides $NO_x$, for the second reduction step, which means that the system may avoid excessively high values for this ratio, for example avoiding $NO_2/NO_x>50\%$, and that the system, by increasing the dosage, may increase the value for the ratio $NO_2/NO_x$ when the value is too low, for example if $NO_2/NO_x<50\%$. The value for the ratio $NO_2/NO_x$ may here, for example through the use of an embodiment of the present invention, be increased by reducing the level of nitrogen oxides $NO_x$. The ratio $NO_2/NO_x$ may assume lower values, for example, after the system has aged for some time. The present invention thus provides for a possibility to counteract this characteristic of deterioration over time, which is negative to the system, and results in values that are too low for the ratio $NO_2/NO_x$. Through the use of the present invention, the level of nitrogen dioxide $NO_2$ may thus be controlled actively, which is possible since the $NO_x$-level may be adjusted upstream of the catalytically oxidizing coating, for example comprising precious metal, in the particulate filter 320. This control of the ratio $NO_2/NO_x$ may, apart from advantages in catalytic performance, such as higher $NO_x$-conversion, also result in a possibility of specifically reducing emissions of nitrogen dioxide $NO_2$, which result in a very poisonous and strong smelling emission. This may result in advantages at a potential future introduction of a separate regulatory requirement relating to nitrogen dioxide $NO_2$, and facilitate a reduction of harmful emissions of nitrogen dioxide $NO_2$. This may be compared with for example the Euro VI-system, in which the fraction of nitrogen dioxide $NO_2$ provided at the exhaust purification may not be impacted in the exhaust treatment system itself.

In other words, the active control of the level of nitrogen dioxide $NO_2$ is facilitated at the use of the present invention, where the active control may be used to increase the level of nitrogen dioxide $NO_2$ in driving modes for which this is necessary Accordingly, an exhaust treatment system may be selected/specified, which for example requires less precious metal and thus also is cheaper to manufacture.

If the fraction of the total conversion of nitrogen oxides $NO_x$ occurring via a rapid reaction path, that is to say via a fast SCR, wherein the reduction occurs via reaction paths over both nitrogen oxide NO and nitrogen dioxide $NO_2$, may be increased through active control of the level of nitrogen dioxide $NO_2$, then the catalyst volume requirement described above may also be reduced. According to one embodiment of the present invention, the first reduction catalyst device in the exhaust treatment system is active at a lower reduction temperature interval $T_{red}$ than the oxidation temperature interval $T_{ox}$, required for the nitrogen dioxide based soot oxidation in the particulate filter cDPF. As an example, the nitrogen dioxide based soot oxidation in the particulate filter DPF may occur at temperatures exceeding 275° C. Hereby, the reduction of nitrogen oxides $NO_x$ in the first reduction catalyst device does not significantly compete with the soot oxidation in the particulate filter DPF, since they are active within at least partly different temperature intervals $T_{red} \neq T_{ox}$. For example, a well selected and optimized first reduction catalyst device may result in a significant conversion of nitrogen oxides $NO_x$ at approximately 200° C., which means that this first reduction catalyst device does not need to compete with the particulate filter's soot oxidation performance.

With the use of the present invention, secondary emissions such as emissions of ammonia $NH_3$ and/or nitrous oxide (laughing gas) $N_2O$ may be reduced in relation to a given conversion level, and/or a given $NO_x$-level. A catalyst, for example an SC (Slip Catalyst), which may be comprised in the second reduction step if the emissions for certain jurisdictions must be reduced to very low levels, may have a certain selectivity against, for example, nitrous oxide $N_2O$, which means that the reduction of the $NO_x$-level through the use of the additional reduction step according to the present invention also shifts the resulting levels for nitrous oxide $N_2O$ downwards. The resulting levels for ammonia $NH_3$ may be shifted downwards in a similar way, when the present invention is used.

Through the use of the present invention a better fuel optimization may be obtained for the vehicle, since there is thus potential to control the engine in a more fuel efficient manner, so that a higher efficiency for the engine is obtained. Thus, a performance gain and/or a reduced emission of carbon dioxide $CO_2$ may be obtained when the present invention is used.

BRIEF DESCRIPTION OF THE DRAWINGS

The invention will be illustrated in more detail below, along with the enclosed drawings, where similar references are used for similar parts, and where.

DETAILED DESCRIPTION OF THE INVENTION

Figure 1:
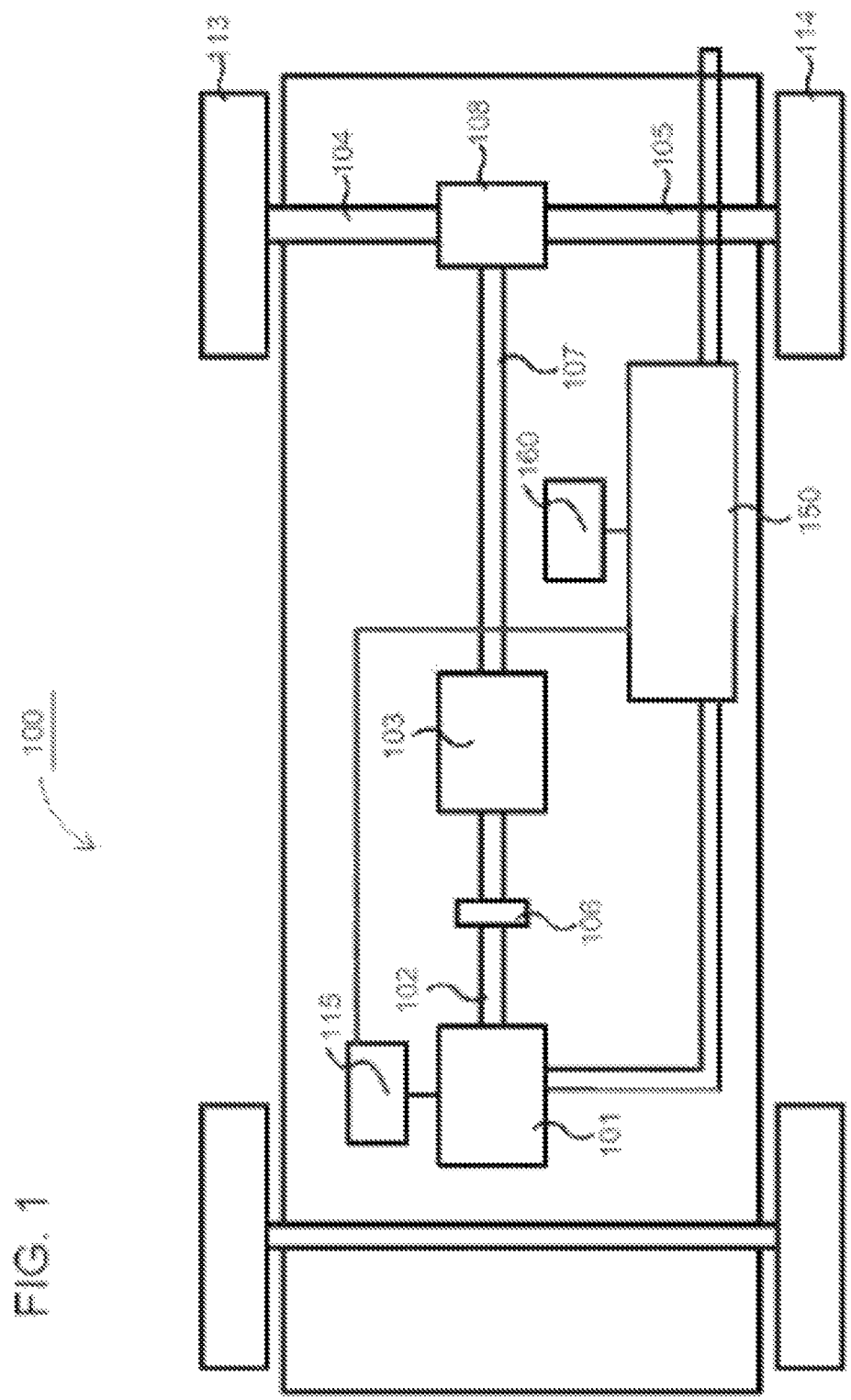
FIG. 1 shows an example vehicle which may comprise the present invention.

FIG. 1 schematically shows an example vehicle 100 comprising an exhaust treatment system 150, which may be an exhaust treatment system 150 according to one embodiment of the present invention. The powertrain comprises a combustion engine 101, which in a customary manner, via an output shaft 102 on the combustion engine 101, usually via a flywheel, is connected to a gearbox 103 via a clutch 106.

The combustion engine 101 is controlled by the engine's control system via a control device 115. Likewise, the clutch 106 and the gearbox 103 may be controlled by the vehicle's control system, with the help of one or more applicable control devices (not shown). Naturally, the vehicle's powertrain may also be of another type, such as a type with a conventional automatic gearbox, of a type with a hybrid powertrain, etc.

An output shaft 107 from the gearbox 103 drives the wheels 113, 114 via a final drive 108, such as e.g. a customary differential, and the drive shafts 104, 105 connected to said final drive 108.

The vehicle 100 also comprises an exhaust treatment system/exhaust purification system 150 for treatment/purification of exhaust emissions resulting from combustion in the combustion chamber of the combustion engine 101, which may consist of cylinders.

Figure 2:
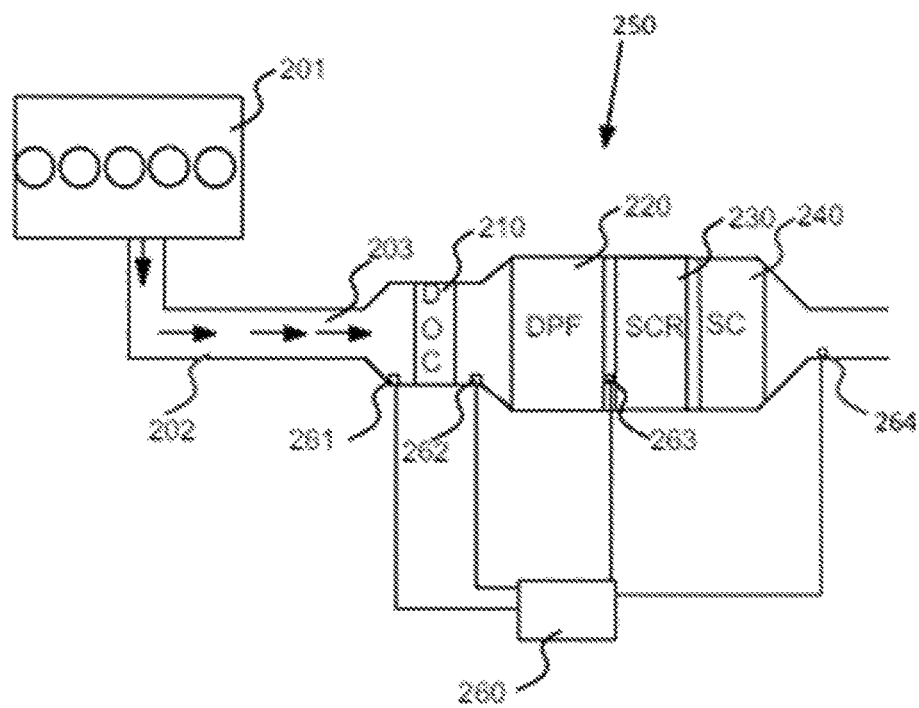
FIG. 2 shows a traditional exhaust treatment system.

FIG. 2 shows a prior art exhaust treatment system 250, which may illustrate the above mentioned Euro VI-system, and which is connected to a combustion engine 201 via an exhaust conduit 202, wherein the exhausts generated at combustion, that is to say the exhaust stream 203, is indicated with arrows. The exhaust stream 203 is led to a diesel particulate filter (DPF) 220, via a diesel oxidation catalyst (DOC) 210. During the combustion in the combustion engine, soot particles are formed, and the particulate filter 220 is used to catch these soot particles. The exhaust stream 203 is here led through a filter structure, wherein soot particles from the exhaust stream 203 are caught passing through, and are stored in the particulate filter 220.

The oxidation catalyst DOC 210 has several functions and is normally used primarily to oxidize, during the exhaust treatment, remaining hydrocarbons $C_xH_y$ (also referred to as HC) and carbon monoxide CO in the exhaust stream 203 into carbon dioxide $CO_2$ and water $H_2O$. The oxidation catalyst DOC 210 may also oxidize a large fraction of the nitrogen monoxides NO occurring in the exhaust stream into nitrogen dioxide $NO_2$. The oxidation of nitrogen monoxide NO into nitrogen dioxide $NO_2$ is important to the nitrogen dioxide based soot oxidation in the filter, and is also advantageous at a potential subsequent reduction of nitrogen oxides $NO_x$. In this respect, the exhaust treatment system 250 further comprises an SCR (Selective Catalytic Reduction) catalyst 230, downstream of the particulate filter DPF 220. SCR catalysts use ammonia $NH_3$, or a composition from which ammonia may be generated/formed, e.g. urea, as an additive for the reduction of nitrogen oxides $NO_x$ in the exhaust stream. The reaction rate of this reduction is impacted, however, by the ratio between nitrogen monoxide NO and nitrogen dioxide $NO_2$ in the exhaust stream, so that the reductive reaction is impacted in a positive direction by the previous oxidation of NO into $NO_2$ in the oxidation catalyst DOC. This applies up to a value representing approximately 50% of the molar ratio $NO_2/NO_x$. For higher fractions of the molar ratio $NO_2/NO_x$, that is to say for values exceeding 50%, the reaction speed is impacted in a strongly negative manner.

As mentioned above, the SCR-catalyst 230 requires additives to reduce the concentration of a compound, such as for example nitrogen oxides $NO_x$, in the exhaust stream 203. Such additive is injected into the exhaust stream upstream of the SCR-catalyst 230 (not shown in FIG. 2). Such additive is often ammonia and/or urea based, or consists of a substance from which ammonia may be extracted or released, and may for example consist of AdBlue, which basically consists of urea mixed with water. Urea forms ammonia at heating (thermolysis) and at heterogeneous catalysis on an oxidizing surface (hydrolysis), which surface may, for example, consist of titanium dioxide $TiO_2$, within the SCR-catalyst. The exhaust treatment system may also comprise a separate hydrolysis catalyst.

The exhaust treatment system 250 is also equipped with a slip-catalyst (SC), which is arranged to oxidize a surplus of ammonia that may remain after the SCR-catalyst 230, and/or to assist the SCR-catalyst with further reduction of $NO_x$. Accordingly, the slip-catalyst SC may provide a potential for improving the system's total conversion/reduction of NOx.

The exhaust treatment system 250 is also equipped with one or several sensors, such as one or several $NO_x$- and/or temperature sensors 261, 262, 263, 264 for the determination of nitrogen oxides and/or temperatures in the exhaust treatment system.

The prior art exhaust treatment system shown in FIG. 2, that is to say the Euro VI-system, has a problem in that catalysts are efficient heat exchangers, which jointly with the rest of the exhaust system, comprising for example the exhaust conduit 202, as well as material and space for silencing and various connections, has a substantial thermal mass/inertia. At starts where the catalyst temperature is below its optimal operating temperature, which may for example be approximately 300° C., and at a throttle from low exhaust temperatures, which may for example occur when light city driving transitions into motorway driving, or after idling and power take-off, the exhaust temperature is filtered by this large thermal mass. Accordingly, the function, and therefore the efficiency of the reduction, is impacted by for example nitrogen oxides $NO_x$ in the SCR-catalyst 230, which may entail that a poor exhaust purification is provided by the system shown in FIG. 2. This means that a smaller amount of emitted nitrogen oxides $NO_x$ may be permitted to be released from the engine 101, compared to if the exhaust purification had been more efficient, which may lead to requirements for a more complex engine and/or a lower fuel efficiency.

In the prior art exhaust treatment system there is also a risk that the relatively cold reductant cools down the exhaust pipe parts locally, and may thereby give rise to precipitates.

This risk of precipitates downstream of the injection increases if the injected amount of reductant must be large.

Among others to compensate for the limited availability of heat/temperature at, for example, cold starts and operation with a low load, a so-called fast SCR may be used, controlling reduction, so that it occurs to as great an extent as possible via reaction paths over both nitrogen oxide NO and nitrogen dioxide $NO_2$. With a fast SCR, the reaction uses equal parts of nitrogen monoxide NO and nitrogen dioxide $NO_2$, which means that an optimal value of the molar ration $NO_2/NO_x$ is near 50%.

In some conditions regarding the catalyst temperature and flow, i.e. for a certain dwell-time in the catalyst ("Space Velocity"), there is a risk that a non-advantageous fraction of nitrogen dioxides $NO_2$ is obtained. Specifically, there is a risk that the ratio $NO_2/NO_x$ exceeds 50%, which may constitute a real problem for exhaust purification. An optimization of the ratio $NO_2/NO_x$ for the above mentioned critical low temperature operating modes, therefore risks providing too high a fraction of nitrogen dioxides $NO_2$ in other operating modes, at for example higher temperatures. This higher fraction of nitrogen dioxides $NO_2$ results in a greater volume requirement for the SCR-catalyst, and/or in a limitation of the amount of nitrogen oxides released from the engine, and accordingly in a poorer fuel efficiency for the vehicle. Additionally, there is a risk that the higher fraction of nitrogen dioxides $NO_2$ also results in emissions of laughing gas $N_2O$. These risks of a non-advantageous fraction of nitrogen dioxide $NO_2$ arising also exist due to the system's ageing. For example, the ratio $NO_2/NO_x$ may assume lower values when the system has aged, which may entail that a catalyst specification, which results in too high fractions of $NO_2/NO_x$ in a non-aged state, must be used to compensate for ageing.

A poor control robustness against dosage errors regarding the amount of reductant and/or a poor control robustness against a sensor error may also constitute a problem for the exhaust treatment system at high $NO_x$-conversion levels.

In the prior art solution described in US2005/0069476, it is suggested that the exhaust system must consist of a close connected SCR-catalyst (ccSCR), which shall be connected near, less than 1 metre away from, the engine's or the turbo's exhaust outlet, followed by an SCRT-system downstream. The SCRT-system is defined by the authors of US2005/0069476 as a prior art system in the direction of the exhaust stream, comprising a DOC-catalyst, a DPF-filter, a urea dosage device, and an SCR-catalyst. Thus, the exhaust treatment system described in US2005/0069476 consists of the following sequential, separate components in the direction of the exhaust stream's flow: the close connected ccSCR-catalyst, the DOC-catalyst, the DPF-filter, and the SCR-catalyst; ccSCR-DOC-DPF-SCR.

According to the solution in US2005/0069476 the close connected ccSCR-catalyst must be fitted near the engine and/or the turbo, in order for the impact of the thermal mass/inertia of the exhaust pipe, and/or of the exhaust treatment system, to be minimized, since such thermal mass/inertia deteriorates the exhaust treatment system's exhaust purifying characteristics. Nevertheless, there is a risk that the solution described in US2005/0069476 may experience performance problems, since neither the close connected ccSCR-catalyst nor the subsequent SCR-catalyst are optimized for cooperative exhaust purification. The subsequent SCR-catalyst in US2005/0069476 is the same catalyst as was previously used in the SCRT-system, which means that this subsequent SCR-catalyst may become unnecessarily expensive as well as not being optimal for cooperative exhaust purification with ccSCR.

In US2005/0069476 the close connected ccSCR-catalyst is added to the exhaust treatment system to take care of problems related to the cold start, which results in a costly solution geared only toward cold starts, wherein such solution, because it contains an extra device (the ccSCR-catalyst) potentially increases the back pressure in the exhaust treatment system, and therefore potentially also increases fuel consumption. Potentially, the fuel consumption thus increases at operation other than cold starts, such as for example at motorway operation, which entails a higher power output and an often greater contribution to the total fuel consumption.

These problems for the system described in US2005/0069476 are resolved at least partly by the present invention.

Figure 3:
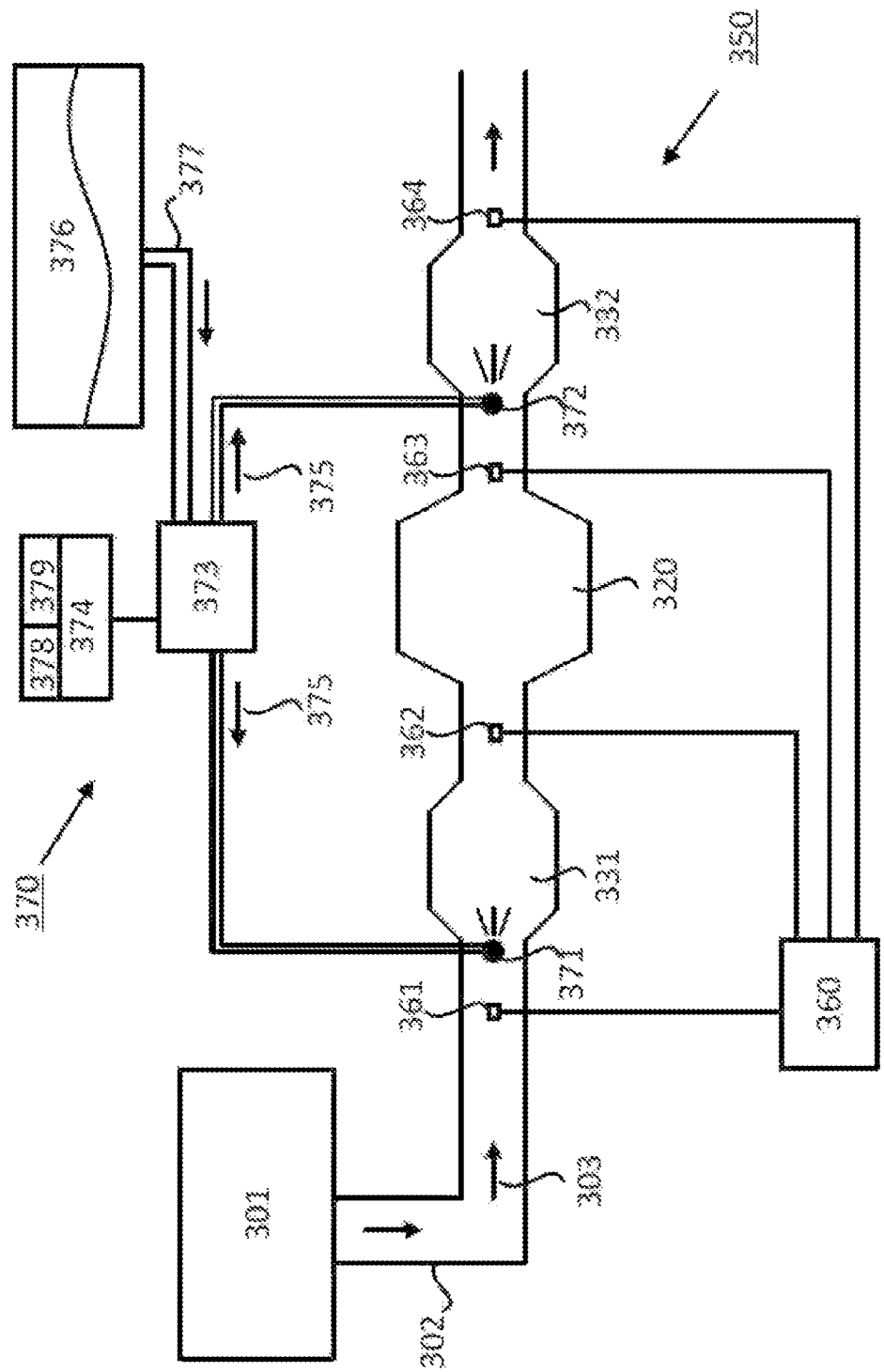
FIG. 3 shows an exhaust treatment system according to the present invention.

FIG. 3 schematically shows an exhaust treatment system 350, which is connected via an exhaust pipe 302 to a combustion engine 301. Exhausts generated at combustion in the engine 301 and the exhaust stream 303 (indicated with arrows) are led to a first dosage device 371, arranged to add a first additive into the exhaust stream 303. A first reduction catalyst device 331 is arranged downstream of the first dosage device 371. The first reduction catalyst device 331 is arranged to reduce nitrogen oxides $NO_x$ in the exhaust stream 303, through the use of the first additive added to the exhaust stream by the first dosage device 371. In more detail, the first reduction catalyst device 371 uses an additive, for example ammonia $NH_3$, or a substance from which ammonia may be generated/formed/released, for the reduction of nitrogen oxides $NO_x$ in the exhaust stream 303. This additive may for example consist of the above mentioned AdBlue.

According to one embodiment of the invention, a first hydrolysis catalyst, which may consist of substantially any suitable hydrolysis coating, and/or a first mixer, may be arranged in connection with the first dosage device 371. The first hydrolysis catalyst, and/or the first mixer, are then used to increase the speed of the decomposition of urea into ammonia, and/or to mix the additive with the emissions, and/or to vaporize the additive.

The exhaust treatment system 350 according to the present invention comprises a particulate filter 320, which at least partly comprises a catalytically oxidizing coating, downstream of the first reduction catalyst device 331. The particulate filter 320 is thus arranged both to catch and to oxidize soot particles, and to oxidize one or several of nitrogen oxides NO and incompletely oxidized carbon compounds in the exhaust stream 303. The exhaust stream 303 is here led through the filter structure of the particulate filter, which is at least partly coated with a catalytically oxidizing material. The soot particles from the exhaust stream 303 passing through are caught in the filter structure, and are stored and oxidized in the particulate filter.

According to one embodiment of the invention, the particulate filter 320 is arranged so that the particulate filter 320 is the first exhaust treatment system component reached by the exhaust stream 303, after it has passed the first reduction catalyst device 331. In other words, the particulate filter 320 according to the embodiment is connected downstream of the reduction catalyst device 331, without any intermediate exhaust treatment system components, except potential conduit connections between the reduction catalyst device 331 and the particulate filter 320.

As described in more detail below, according to one embodiment, the first reduction catalyst device 331 may comprise a first selective catalytic reduction catalyst $SCR_1$, a first selective catalytic reduction catalyst $SCR_1$, followed downstream by a first slip-catalyst $SC_{11}$, or a first selective catalytic reduction catalyst $SCR_1$ combined with an oxidizing coating in the outlet part on the same substrate. When the particulate filter 320 is the first exhaust treatment system component reached by the exhaust stream 303 after it has passed the first reduction catalyst device 331, substantially no oxidation of nitrogen oxide NO and/or incompletely oxidized carbon compounds occurs between the first reduction catalyst device 331 and the particulate filter 320.

One advantage with connecting the particulate filter 320 downstream of the reduction catalyst device 331, without any intermediate exhaust treatment system components, apart from potential pipe connections, is that the number of substrates in the exhaust treatment system 350 is smaller, than if for example the oxidation catalyst DOC had been arranged between the particulate filter 320 and the reduction catalyst device 331. Fewer substrates result in a possibility for a more compact exhaust treatment system 350, with lower back pressure, which is simpler and cheaper to manufacture and/or fit. In such an exhaust treatment system 350, the first reduction catalyst device 331 provides a protection for the oxidizing coating of the particulate filter placed upstream, which may result in a chemical robustness. The chemical robustness is also reinforced by the substrate in the particulate filter 320, that is to say the catalytically oxidizing coating in the particulate filter, being relatively physically long, according to one embodiment of the invention.

The particulate filter cDPF 320 is, at least partly, coated with a catalytically oxidizing coating, wherein such oxidizing coating may comprise at least one precious metal. That is to say, the particulate filter 320 may, at least partly, be coated with one or several precious metals, for example platinum. According to one embodiment of the present invention, the coating of the filter is arranged in the front part of the filter, that is to say in connection with the filter's inlet. This may also be expressed as though the coating, for example comprising one or several precious metals, being placed at that end of the filter, where the exhaust stream flows into the filter. The particulate filter cDPF 320, comprising the oxidizing coating, has several advantages compared to a classic particulate filter DPF, without an oxidizing coating.

The particulate filter cDPF 320, comprising the oxidizing coating, leads to an improved $NO_2$-based regeneration of the filter, that is to say to an improved $NO_2$-based soot oxidation, which may also be referred to as a passive regeneration of the filter. In an exhaust treatment system comprising a particulate filter DPF, that is to say without an oxidizing coating, and which does not have an oxidation catalyst DOC between the reduction catalyst and the classic particulate filter DPF, a very limited $NO_2$-based oxidation of soot in the filter is obtained.

The system according to the embodiment of the present invention relates to, through the use of the filter with the oxidizing coating, cleaning the filter of soot through the $NO_2$-based passive regeneration/oxidation. However, the present invention may also advantageously be used in connection with active regeneration of the filter, which is to say when the regeneration is initiated by an injection of fuel upstream of the filter, for example through the use of an injector. At an active regeneration the exhaust treatment system according to the invention has one advantage in that the first reduction catalyst device may itself cope with a certain $NO_x$-conversion, while the second reduction catalyst device, arranged downstream of the filter, due to the regeneration experiences such a high temperature that it has difficulties in achieving a high conversion level.

At the use of the engine's injection system at a regeneration of the particulate filter cDPF, the first reduction catalyst device will at least partly assist the particulate filter cDPF with partly oxidizing the fuel into primarily carbon monoxide CO. Thus, the regeneration of the particulate filter cDPF is simplified, compared to exhaust treatment systems which do not have a first reduction catalyst device according to the present invention.

The particulate filter cDPF 320, which comprises the oxidizing coating, also results in more stable conditions for the nitrogen dioxide level $NO_2$ at the second reduction catalyst device 332. Additionally, the use of the particulate filter cDPF 320, comprising the oxidizing coating, means that the value for the ratio $NO_2/NO_x$, that is to say the level of $NO_2$, may be controlled.

The particulate filter 320, which at least partly comprises a catalytically oxidizing coating, may also oxidize soot particles and one or several incompletely oxidized nitrogen and/or carbon compounds more efficiently, thanks to the oxidizing coating.

Downstream of the particulate filter 320, the exhaust treatment system 350 is equipped with a second dosage device 372, which is arranged to supply a second additive to the exhaust stream 303, where such second additive comprises ammonia $NH_3$, or a substance, for example AdBlue, from which ammonia may be generated/formed/released, as described above. The second additive may here consist of the same additive as the above mentioned first additive, that is to say that the first and second additives are of the same type and may possibly also come from the same tank. The first and second additives may also be of different types and may come from different tanks.

According to one embodiment of the invention, a second hydrolysis catalyst and/or a second mixer may also be arranged in connection with the second dosage device 372. The function and embodiment of the second hydrolysis catalyst and/or the second mixer correspond to those described above for the first hydrolysis catalyst and the first mixer.

The exhaust treatment system 350 also comprises a second reduction catalyst device 332, which is arranged downstream of the second dosage device 372. The second reduction catalyst device 332 is arranged to reduce nitrogen oxides $NO_x$ in the exhaust stream 303 through use of the second additive and, if the first additive remains in the exhaust stream 303 when this reaches the second reduction catalyst device 332, also through use of the first additive.

The exhaust treatment system 350 may also be equipped with one or several sensors, such as one or several $NO_x$-sensors 361, 363, 364 and/or one or several temperature sensors 362, 363, which are arranged for the determination of $NO_x$-concentrations and temperatures in the exhaust treatment system 350, respectively. A robustness against errors in administered doses of reductant may be achieved by way of an embodiment of the invention, wherein an $NO_x$-sensor 363 is placed between the two dosage devices 371, 372, and preferably between the particulate filter 320 and the second dosage device 372, in the exhaust treatment system 350. This makes it possible, by way of the second dosage device 372, to correct a potential dosage error, which has created unforeseen emission levels downstream of the first reduction device 371 and/or the particulate filter 320.

This placement of the $NO_x$-sensor 363 between the two dosage devices 371, 372 and, preferably, between the particulate filter cDPF 320 and the second dosage device 372, also makes it possible to correct the amount of additive administered by the second dosage device 372 for nitrogen oxides $NO_x$, which may be created over the particulate filter cDPF 320 from excess remainders of additive from the dosage carried out by the first dosage device 371.

The $NO_x$-sensor 364 downstream of the second reduction catalyst device 332 may be used at feedback of dosage of additive.

Through the use of the exhaust treatment system 350 shown in FIG. 3, both the first reduction catalyst device 331 and the second reduction catalyst device 332 may be optimized with respect to a selection of catalyst characteristics for the reduction of nitrogen oxides $NO_x$, and/or with respect to volumes for the first 331 and second 332 reduction catalyst devices, respectively. Through the present invention, the particulate filter 320 is used to the advantage of the function, by taking into account how its thermal mass impacts the temperature for the second reduction catalyst 332, and how the catalytic coating impacts the $NO_2/NO_x$-fraction upstream of the second reduction catalyst 332 at exhaust purification.

By taking into account the thermal inertia of the particulate filter 320, the first reduction catalyst device 331 and the second reduction catalyst device 332, respectively, may be optimized with respect to the specific temperature function each will experience. Since, according to the present invention, the optimized first 331 and second 332 reduction catalyst devices are set up to purify the exhausts in cooperation, the exhaust treatment system 350 may be made compact. Since the space allocated to the exhaust treatment system 350, for example in a vehicle, is limited, it is a great advantage to provide a compact exhaust treatment system, through a high usage level of the catalysts used according to the present invention. Such high usage level and the associated smaller volume requirement, also provide a possibility for a reduced back pressure, and accordingly also a lower fuel consumption.

The present invention provides for an exhaust treatment system 350, which efficiently reduces the amount of nitrogen oxides $NO_x$ in the exhaust stream in substantially all driving modes, comprising especially cold starts and throttle, that is to say increased requested torque, from a low exhaust temperature and a load deduction, that is to say from a reduced requested torque. Thus, the exhaust treatment system 350 according to the present invention is suitable in substantially all driving modes, which give rise to a transient temperature evolution in the exhaust treatment. One example of such a driving mode may consist of city driving comprising many starts and decelerations.

The problems with prior art technology, which are related to a too high fraction of nitrogen dioxides $NO_2$, may be resolved at least partly with the use of the present invention, since two reduction catalyst devices 371, 372 are comprised in the exhaust treatment system 350. The problem may be resolved by way of combining the present invention with the knowledge that the amount of nitrogen oxides $NO_x$ controls how large a fraction of nitrogen dioxides $NO_2$ is obtained downstream of a filter/substrate coated with a catalytic oxidizing coating, that is to say that the amount of nitrogen oxides $NO_x$ may be used to control the value of the ratio $NO_2/NO_x$. By reducing the nitrogen oxides $NO_x$ over the first reduction catalyst device 371 during operation at low temperatures, a requirement regarding a given ratio between nitrogen dioxide and nitrogen oxides $NO_2/NO_x$ in the exhausts reaching the second reduction catalyst device 372 may be fulfilled with a smaller, and accordingly less costly, amount of oxidizing coating.

The present invention has an advantage in that the added manufacturing cost as a consequence of the invention may be kept at a low level, since the oxidation catalyst DOC 210, available in prior art systems at manufacture, according to one embodiment of the invention may be replaced by the first reduction catalyst device 331 according to the present invention. Thus, a manufacturing operation, comprising assembly of the oxidation catalyst DOC 210, may easily be replaced with another manufacturing operation, comprising assembly of the first reduction catalyst device 331 according to the present invention. This results in a minimal added cost to the assembly and/or manufacturing.

Since the oxidation catalyst DOC 210, which was present in prior art system, may be replaced with the first reduction catalyst device 331 according to the present invention, retrofitting on already manufactured units, comprising exhaust treatment systems according to the Euro VI-specification, is possible. Additionally, it is a requirement that an additional dosage device is fitted in the exhaust treatment system, which comprises devices for mixture and/or vaporization of the additive.

The first reduction catalyst device 331 in the exhaust treatment system 350 is, according to one embodiment, active at a lower reductant temperature interval $T_{red}$ than the oxidation temperature interval $T_{ox}$, at which the nitrogen dioxide based soot oxidation, that is to say the oxidation of incompletely oxidized carbon compounds in the particulate filter 320, is active. In other words, the temperature for a so-called "light-off" for soot oxidation in the particulate filter 320 is higher than the "light-off" for the reduction of nitrogen oxides $NO_x$ in the first reduction catalyst device 331. Accordingly, the reduction of nitrogen oxides $NO_x$ in the first reduction catalyst device 331 does not necessarily compete with the soot oxidation in the particulate filter 320, since they are active within at least partly different temperature intervals; $T_{red} \neq T_{ox}$.

The exhaust treatment system sometimes requests that the engine generate heat for the exhaust treatment system, to be able to achieve a sufficient efficiency with respect to exhaust purification. This heat generation is then achieved at the expense of the engine's efficiency relating to fuel consumption, which decreases. One advantageous characteristic of the exhaust treatment system according to the present invention, is that the first reduction catalyst device upstream of the filter may be made to react faster to such generated heat, than what would have been possible for example with the Euro VI-system. Therefore, less fuel is consumed overall with the use of the present invention.

According to one embodiment of the present invention, the engine is controlled so that it generates such heat in an extent making the first reduction catalyst device reach a certain given temperature/performance. Therefore, an efficient exhaust purification may be obtained, since the first reduction catalyst device may operate at a favorable temperature, while unnecessary heating, and therefore fuel inefficiency, is avoided.

As opposed to the above mentioned prior art solutions, the first reduction catalyst device 331 according to the present invention does not need to be closely connected to the engine and/or the turbo. The fact that the first reduction catalyst device 331 according to the present invention may be fitted further away from the engine and/or the turbo, and for example may be located in the silencer, has an advantage in that a longer mixing distance for additive may be obtained in the exhaust stream between the engine, and/or the turbo, and the first reduction catalyst device 331. This means that an improved utilization is obtained for the first reduction catalyst device 331. Meanwhile, thanks to the present invention the many advantages mentioned in this document associated with the potential reduction of nitrogen oxides $NO_x$ both upstream and downstream of the thermally inertial filter cDPF are achieved.

According to different embodiments of the present invention, the first reduction catalyst device 331 consists of one of:

- a first selective catalytic reduction catalyst $SCR_1$;
- a first selective catalytic reduction catalyst $SCR_1$, integrated downstream with a first slip-catalyst $SC_1$, wherein the first slip-catalyst $SC_1$ is arranged to oxidize a residue of additive, wherein the residue may consist for example of urea, ammonia $NH_3$ or isocyanic acid HNCO, and/or to assist $SCR_1$ with additional reduction of nitrogen oxides $NO_x$ in the exhaust stream 303;
- a first selective catalytic reduction catalyst $SCR_1$, followed downstream by a separate first slip-catalyst $SC_1$, wherein the first slip-catalyst $SC_1$ is arranged to oxidize a residue of additive, wherein the residue may consist for example of urea, ammonia $NH_3$ or isocyanic acid HNCO, and/or to assist $SCR_1$ with further reducing nitrogen oxides $NO_x$ in the exhaust stream 303;
- a first slip-catalyst $SC_1$, integrated downstream with a first selective catalytic reduction catalyst $SCR_1$, wherein the first slip-catalyst $SC_1$ is arranged to oxidize additive, and/or to assist the first selective catalytic reduction catalyst $SCR_1$ with a reduction of nitrogen oxides $NO_x$ in the exhaust stream 303;
- a first slip-catalyst $SC_1$, followed downstream by a separate first selective catalytic reduction catalyst $SCR_1$, wherein the first slip-catalyst $SC_1$ is arranged to oxidize additive, and/or to assist the first selective catalytic reduction catalyst $SCR_1$ with a reduction of nitrogen oxides $NO_x$ in the exhaust stream 303;
- a first slip-catalyst $SC_1$, integrated downstream with a first selective catalytic reduction catalyst $SCR_1$, integrated downstream with an additional first slip-catalyst $SC_{1b}$, wherein the first slip-catalyst $SC_1$ and/or the additional first slip-catalyst $SC_{1b}$ is arranged to oxidize additive, and/or to assist the first selective catalytic reduction catalyst $SCR_1$ with a reduction of nitrogen oxides $NO_x$ in the exhaust stream 303;
- a first slip-catalyst $SC_1$, followed downstream by a separate first selective catalytic reduction catalyst $SCR_1$, followed downstream by a separate additional first slip-catalyst $SC_{1b}$, wherein the first slip-catalyst $SC_1$ and/or the additional first slip-catalyst $SC_{1b}$ is arranged to oxidize additive, and/or to assist the first selective catalytic reduction catalyst $SCR_1$ with a reduction of nitrogen oxides $NO_x$ in the exhaust stream 303;
- a first slip-catalyst $SC_1$, integrated downstream with a first selective catalytic reduction catalyst $SCR_1$, followed downstream by a separate additional first slip-catalyst $SC_{1b}$, wherein the first slip-catalyst $SC_1$ and/or the additional first slip-catalyst $SC_{1b}$ is arranged primarily to reduce nitrogen oxides $NO_x$, and secondarily to oxidize additive in the exhaust stream 303;
- a first slip-catalyst $SC_1$, followed downstream by a separate first selective catalytic reduction catalyst $SCR_1$, integrated downstream with a separate additional first slip-catalyst $SC_{1b}$, wherein the first slip-catalyst $SC_1$ and/or the additional first slip-catalyst $SC_{1b}$ is arranged primarily to reduce nitrogen oxides $NO_x$, and secondarily to oxidize additive in the exhaust stream 303;
- a first slip-catalyst $SC_1$, which is arranged primarily to reduce nitrogen oxides $NO_x$, and secondarily to oxidize a residue of additive, wherein the residue may consist for example of urea, ammonia $NH_3$ or isocyanic acid HNCO, in the exhaust stream 303; and
- a first selective catalytic reduction catalyst $SCR_1$ combined with an oxidizing coating in the outlet part of the same substrate, which is also sometimes referred to as "combicat", $SCR_{komb}$;
- a first slip-catalyst $SC_1$, integrated downstream with a first selective catalytic reduction catalyst $SCR_1$ combined with a purely oxidizing coating in its outlet part on the same substrate, which is also sometimes referred to as "combicat", wherein the first slip-catalyst $SC_1$ is arranged primarily to reduce nitrogen oxides $NO_x$, and secondarily to oxidize additive in the exhaust stream 303; and
- a first slip-catalyst $SC_1$, followed downstream by a separate first selective catalytic reduction catalyst $SCR_1$ combined with a purely oxidizing coating in its outlet part on the same substrate, which is also sometimes referred to as "combicat", wherein the first slip-catalyst $SC_1$ is arranged primarily to reduce nitrogen oxides $NO_x$, and secondarily to oxidize additive in the exhaust stream 303.

According to different embodiments, the second reduction catalyst device 332 consists of one of:

- a second selective catalytic reduction catalyst $SCR_2$;
- a second selective catalytic reduction catalyst $SCR_2$, integrated downstream with a second slip-catalyst $SC_2$, wherein the second slip-catalyst $SC_2$ is arranged to oxidize a residue of additive and/or to assist $SCR_2$ with an additional reduction of nitrogen oxides $NO_x$ in the exhaust stream 303; and
- a second selective catalytic reduction catalyst $SCR_2$, followed downstream by a separate second slip-catalyst $SC_2$, wherein the second slip-catalyst $SC_2$ is arranged to oxidize a residue of additive, and/or to assist $SCR_2$ with an additional reduction of nitrogen oxides $NO_x$ in the exhaust stream 303.

In this document, the term slip-catalyst SC is used generally to denote a catalyst, which is arranged to oxidize additive in the exhaust stream 303, and/or which is arranged so that it is able to reduce residual nitrogen oxides $NO_x$ in the exhaust stream 303. According to one embodiment of the present invention, such a slip catalyst SC is arranged primarily to reduce nitrogen oxides $NO_x$, and secondarily to oxidize a residue of additive, that is to say that the slip-catalyst SC is a multifunctional slip-catalyst. In other words, the multifunctional slip-catalyst SC may take care of slip-residues of both additive and nitrogen oxides $NO_x$. This may also be described as the slip-catalyst SC being an extended ammonia slip-catalyst ASC, which is set up to reduce nitrogen oxides $NO_x$ in the exhaust stream 303, so that a general/multifunctional slip-catalyst SC is obtained, which takes care of several types of slip, meaning it takes care of residues of both additive and nitrogen oxides $NO_x$.

According to one embodiment of the present invention, at least the following reactions may for example be carried out in a multifunctional slip-catalyst SC, which both reduces nitrogen oxides $NO_x$ and oxidizes additive:

$$NH_3 + O_2 \rightarrow N_2; \quad \text{(Equation 1)}$$

and $$NO_x + NH_3 \rightarrow N_2 + H_2O. \quad \text{(Equation 2)}$$

Here, the reaction according to equation 1 results in an oxidation of additive, for example residues of additive, comprising ammonia. The reaction according to equation 2 results in a reduction of nitrogen oxides $NO_x$. Accordingly, the additive may here be oxidized, as well as residues of ammonia $NH_3$, isocyanic acid HNCO, urea or similar, may be oxidized. These residues of additive, that is to say ammonia $NH_3$, HNCO, urea or similar, may here also be used to oxidize nitrogen oxides $NO_x$.

In order to obtain these characteristics, that is to say to obtain a multifunctional slip-catalyst, the slip-catalyst may according to one embodiment comprise one or several substances comprised in platinum metals (PGM; Platinum Group Metals), that is to say one or several of iridium, osmium, palladium, platinum, rhodium and ruthenium. The slip-catalyst may also comprise one or several other substances, which give the slip-catalyst similar characteristics as platinum group metals. The slip-catalyst may also comprise an $NO_x$-reducing coating, where the coating may for example comprise Cu- or Fe-Zeolite or vanadium. Zeolite may here be activated with an active metal, such as for example copper (Cu) or iron (Fe).

For both the first 331 and second 332 reduction catalyst device, its catalytic characteristics may be selected based on the environment to which it is exposed, or will be exposed to. Additionally, the catalytic characteristics for the first 331 and second 332 reduction catalyst device may be adapted so that they may be allowed to operate in symbiosis with each other. The first 331 and second 332 reduction catalyst device may also comprise one or several materials, providing the catalytic characteristic. For example, transition metals such as vanadium and/or tungsten may be used, for example in a catalyst comprising $V_2O_5/WO_3/TiO_2$. Metals such as iron and/or copper may also be comprised in the first 331 and/or second 332 reduction catalyst device, for example in a Zeolite-based catalyst.

The exhaust treatment system 350, which is schematically illustrated in FIG. 3, may according to different embodiments accordingly have a number of different structures/configurations, which may be summarized as below, and where the respective units $SCR_1$, $SCR_2$, cDPF, $SCR_{1\_komb}$, $SC_1$, $SC_{1b}$, $SC_2$ have the respective characteristics described in this entire document. The particulate filter 320 with the at least partly catalytically oxidizing coating is here referred to as cDPF. The catalytically oxidizing coating may be adapted according to its characteristics, to oxidize nitrogen oxides NO on the one hand, and to oxidize incompletely oxidized carbon compounds on the other. Incompletely oxidized carbon compounds may for example consist of fuel residue created through the engine's injection system.

According to one configuration according to the invention, the exhaust treatment system has the structure $SCR_1$-cDPF-$SCR_2$. That is to say, the exhaust treatment system 350 comprises a first selective catalytic reduction catalyst $SCR_1$, followed downstream by a particulate filter with an at least partly catalytically oxidizing coating cDPF, followed downstream by a second selective catalytic reduction catalyst $SCR_2$. A symbiotic usage in the exhaust treatment system 350 of both the first selectively catalytic reduction catalyst $SCR_1$, jointly with the second selectively catalytic reduction catalyst $SCR_2$ may facilitate the omission of second slip-catalyst $SC_2$ in the exhaust treatment system 350 for certain applications, for example at limited $NO_x$-levels, which result in limited conversion level requirements. This is an advantage, for example compared with the above mentioned Euro VI-system, in which a slip-catalyst is, in practice, required. Since an SCR-catalyst is typically cheaper than an SC-catalyst, thanks to this embodiment of the invention, the manufacturing cost may be reduced by omitting the second slip-catalyst $SC_2$.

The first selective catalytic reduction catalyst $SCR_1$ may be used with the objective of generating heat, for example by oxidation of hydrocarbons HC in the exhaust stream, which facilitates regeneration of sulphur contaminated components, such as the first selective catalytic reduction catalyst $SCR_1$ and/or components arranged downstream of the latter. At regeneration of the sulphur contaminated components, the amount of sulphur which is stored in the components is reduced, that is to say in at least one of the first selective catalytic reduction catalyst $SCR_1$ and components arranged downstream of the latter.

According to one configuration according to the invention, the exhaust treatment system has the structure $SCR_1$-$SC_1$-cDPF-$SCR_2$. That is to say, the exhaust treatment system 350 comprises a first selective catalytic reduction catalyst $SCR_1$, followed downstream by a first slip-catalyst $SC_1$, followed downstream by a particulate filter with an at least partly catalytically oxidizing coating cDPF, followed downstream by a second selective catalytic reduction catalyst $SCR_2$. As mentioned above, the use of both the first selectively catalytic reduction catalyst $SCR_1$ and the second selectively catalytic reduction catalyst $SCR_2$ in the exhaust treatment system 350, facilitates the omission of a second slip-catalyst $SC_2$ in the exhaust treatment system 350 for some applications, which reduces the manufacturing cost for the vehicle. The use of the first slip-catalyst $SC_1$ facilitates a greater load, and therefore a better use of the first selective catalytic reduction catalyst $SCR_1$, and it also facilitates a reduction of the starting temperature (the "light off"-temperature) for the $NO_x$-reduction.

According to one embodiment of the present invention, the first reduction catalyst device 331 here comprises a slip-catalyst $SC_1$, which is multifunctional, and therefore reduces nitrogen oxides $NO_x$ by using residues of the additive, and which also oxidizes the residues of the additive (as described above). This entails a number of advantages for the exhaust treatment system. The first slip-catalyst $SC_1$ may here be used in symbiosis with the first reduction catalyst $SCR_1$, so that the activity of the first slip-catalyst $SC_1$ with respect to reduction of nitrogen oxides $NO_x$ and oxidation of residues of additive, as well as the slip-catalyst's $SC_1$ deposition characteristics for the reductant, constitute a complement to the function of the first reduction catalyst $SCR_1$. The combination of these characteristics for the first reduction catalyst device 331, comprising the first reduction catalyst $SCR_1$ and the first slip-catalyst $SC_1$, means that a higher conversion level may be obtained over the first reduction catalyst device 331. In addition, the use of the first slip-catalyst $SC_1$ in the first reduction catalyst device 331 results in conditions making it possible to avoid a non-selective oxidation of reductant occurring in components placed downstream of the first reduction catalyst device 331 in the exhaust treatment system, which may potentially comprise platinum metals.

Furthermore, tests have shown that the reduction of nitrogen oxides $NO_x$ with the first multifunctional slip-catalyst $SC_1$ in the first catalyst device 331 becomes surprisingly efficient. This is a result of sufficient amounts of nitrogen oxides $NO_x$ being present in the exhaust stream 303 at the first slip-catalyst $SC_1$ in the first catalyst device 331, after the first reduction catalyst $SCR_1$, in order for an efficient reduction of nitrogen oxides $NO_x$ to be obtained. In other words, the relatively good availability of nitrogen oxides $NO_x$ at the first slip-catalyst $SC_1$ may be used to achieve a very good performance, and/or a very good utilization, when a multifunctional slip-catalyst $SC_1$ is used in the first catalyst device 331.

The first selective catalytic reduction catalyst $SCR_1$, and/or the first slip-catalyst $SC_1$, may be used with the objective of generating heat, for example through oxidation of hydrocarbons HC in the exhaust stream, which facilitates regeneration of sulphur contaminated components, such as the first selective catalytic reduction catalyst $SCR_1$ and/or components arranged downstream of the latter. At regeneration of the sulphur contaminated components, the amount of sulphur which is stored in the components is reduced, that is to say in at least one of the first selective catalytic reduction catalyst $SCR_1$ and components arranged downstream of the latter.

According to one configuration according to the invention, the exhaust treatment system has the structure $SCR_{1\_komb}$-cDPF-$SCR_2$. That is to say, the exhaust treatment system 350 comprises a first selective catalytic reduction catalyst $SCR_1$, combined with an oxidizing coating in the outlet part on the same substrate (also referred to as "combicat"), followed downstream by a particulate filter with an at least partly catalytically oxidizing coating cDPF, followed downstream by a second selective catalytic reduction catalyst $SCR_2$. Here as well, because of the use of both the first selectively catalytic reduction catalyst $SCR_1$ and the second selectively catalytic reduction catalyst $SCR_2$, the second slip-catalyst $SC_2$ may be omitted from the exhaust treatment system 350 for certain applications. This exhaust treatment system, that is to say the system with $SCR_{1\_komb}$-cDPF-$SCR_2$, may facilitate a reduction of the starting temperature (the "light-off"-temperature) for the $NO_x$-reduction, and also has an advantage in that the exhaust temperature may be increased more efficiently in the system, through oxidation of hydrocarbons in the oxidizing part in the outlet part of $SCR_{1\_komb}$. Such a temperature increase may be advantageous at a so-called active regeneration of the particulate filter with the at least partly catalytically oxidizing coating cDPF.

The first selective catalytic reduction catalyst $SCR_1$ combined with an oxidizing coating in the outlet part on the same substrate $SCR_{1\_komb}$, may be used with the objective of generating heat, for example through oxidation of hydrocarbons HC in the exhaust stream, which facilitates regeneration of sulphur contaminated components, such as the first selective catalytic reduction catalyst $SCR_1$ combined with an oxidizing coating in the outlet part on the same substrate $SCR_{1\_komb}$, and/or components arranged downstream of the latter. At regeneration of the sulphur contaminated components, the amount of sulphur which is stored in the components is reduced, that is to say in at least one of the first selective catalytic reduction catalyst $SCR_1$ combined with an oxidizing coating in the outlet part on the same substrate $SCR_{1\_komb}$, and components arranged downstream of the latter.

According to one configuration according to the invention the exhaust treatment system has the structure $SCR_1$-cDPF-$SCR_2$-$SC_2$. That is to say, the exhaust treatment system 350 comprises a first selective catalytic reduction catalyst $SCR_1$, followed downstream by a particulate filter with an at least partly catalytically oxidizing coating cDPF, followed downstream by a second selective catalytic reduction catalyst $SCR_2$, followed downstream by a second slip-catalyst $SC_2$. This exhaust treatment system 350 facilitates emission levels for nitrogen oxides $NO_x$ close to zero, since the second reduction catalyst $SCR_2$ may be heavily loaded, for example by increased dosage of the second additive, since it is followed downstream by the second slip-catalyst $SC_2$. The use of the second slip-catalyst $SC_2$ results in additionally improved performance for the system, since additional slip may be taken care of by the second slip-catalyst $SC_2$.

The first selective catalytic reduction catalyst $SCR_1$ may be used with the objective of generating heat, for example by oxidation of hydrocarbons HC in the exhaust stream, which facilitates regeneration of sulphur contaminated components, such as the first selective catalytic reduction catalyst $SCR_1$ and/or components arranged downstream of the latter. At regeneration of the sulphur contaminated components, the amount of sulphur which is stored in the components is reduced, that is to say in at least one of the first selective catalytic reduction catalyst $SCR_1$ and components arranged downstream of the latter According to one configuration according to the invention, the exhaust treatment system has the structure $SCR_1$-$SC_1$-cDPF-$SCR_2$-$SC_2$. That is to say, the exhaust treatment system 350 comprises a first selective catalytic reduction catalyst $SCR_1$, followed downstream by a first slip-catalyst $SC_1$, followed downstream by a particulate filter with an at least partly catalytically oxidizing coating cDPF, followed downstream by a second selective catalytic reduction catalyst $SCR_2$, followed downstream by a second slip-catalyst $SC_2$. This exhaust treatment system 350 facilitates emission levels for nitrogen oxides $NO_x$ close to zero, since the second reduction catalyst $SCR_2$ may be made to work hard, for example by increased dosage of the second additive, since it is followed downstream by the second slip-catalyst $SC_2$. The use of the second slip-catalyst $SC_2$ results in additionally improved performance for the system, since additional slip may be taken care of by the second slip-catalyst $SC_2$. The use of the first slip-catalyst $SC_1$ also facilitates a reduction of the starting temperature (the "light-off"-temperature) for the $NO_x$-reduction, and may also result in a greater load and thus an improved utilization of the first selective catalytic reduction catalyst $SCR_1$.

According to one embodiment, the first reduction catalyst device 331 here comprises a slip-catalyst $SC_1$, as described above, which is multifunctional and therefore reduces nitrogen oxides $NO_x$ through the use of residues of additive, and also oxidizes the residues of the additive (as described above). This entails a number of advantages for the exhaust treatment system. The first slip-catalyst $SC_1$ may here be used in symbiosis with the first reduction catalyst $SCR_1$, so that the activity of the first slip-catalyst $SC_1$ with respect to reduction of nitrogen oxides $NO_x$ and oxidation of residues of additive, as well as the slip-catalyst's $SC_1$ deposition characteristics for the reductant, constitute a complement to the function of the first reduction catalyst $SCR_1$. The combination of these characteristics for the first reduction catalyst device 331, comprising the first reduction catalyst $SCR_1$ and the first slip-catalyst $SC_1$, means that a higher conversion level may be obtained over the first reduction catalyst device 331. In addition, the use of the first slip-catalyst $SC_1$ in the first reduction catalyst device 331 results in conditions making it possible to avoid a non-selective oxidation of reductant occurring in components placed downstream of the first reduction catalyst device 331 in the exhaust treatment system, which may potentially comprise platinum metals.

Furthermore, tests have shown that the reduction of nitrogen oxides $NO_x$ with the first multifunctional slip-catalyst $SC_1$ in the first catalyst device 331 becomes surprisingly efficient. This is a result of sufficient amounts of nitrogen oxides $NO_x$ being present in the exhaust stream 303 at the first slip-catalyst $SC_1$ in the first catalyst device 331, after the first reduction catalyst $SCR_1$, in order for an efficient reduction of nitrogen oxides $NO_x$ to be obtained. In other words, the relatively good availability of nitrogen oxides $NO_x$ at the first slip-catalyst $SC_1$ is used to achieve a very good performance, and/or a very good utilization, when a multifunctional slip-catalyst $SC_1$ is used in the first catalyst device 331.

The first selective catalytic reduction catalyst $SCR_1$, and/or the first slip-catalyst $SC_1$, may be used with the objective of generating heat, for example by oxidation of hydrocarbons HC in the exhaust stream, which facilitates regeneration of sulphur contaminated components, such as the first selective catalytic reduction catalyst $SCR_1$ and/or components arranged downstream of the latter. At regeneration of the sulphur contaminated components, the amount of sulphur which is stored in the components is reduced, that is to say in at least one of the first selective catalytic reduction catalyst $SCR_1$ and components arranged downstream of the latter.

According to one configuration according to the invention, the exhaust treatment system has the structure $SCR_{1\_komb}$-$SCR_2$-$SC_2$. That is to say, the exhaust treatment system 350 comprises a first selective catalytic reduction catalyst $SCR_1$, combined with an oxidizing coating in the outlet part on the same substrate, followed downstream by a particulate filter with an at least partly catalytically oxidizing coating cDPF, followed downstream by a second selective catalytic reduction catalyst $SCR_2$, followed downstream by a second slip-catalyst $SC_2$. This exhaust treatment system 350 also facilitates a reduction of the starting temperature (the "light-off"-temperature) for the $NO_x$-reduction, and also has an advantage in that the exhaust temperature may be increased more efficiently in the system through oxidation of hydrocarbons in the oxidizing part in the outlet part of $SCR_{1\_komb}$. Such a temperature increase may be advantageous at a so-called active regeneration of the particulate filter with the at least partly catalytically oxidizing coating cDPF. This exhaust treatment system 350 also facilitates emission levels for nitrogen oxides $NO_x$ close to zero, since the second reduction catalyst $SCR_2$ may be made to work hard, for example by increased dosage of the second additive, since it is followed downstream by the second slip-catalyst $SC_2$. The use of the second slip-catalyst $SC_2$ results in additionally improved performance for the system, since additional slip may be taken care of by the second slip-catalyst $SC_2$. The first selective catalytic reduction catalyst $SCR_1$ combined with an oxidizing coating in the outlet part on the same substrate $SCR_{1\_komb}$, may be used with the objective of generating heat, for example through oxidation of hydrocarbons HC in the exhaust stream, which facilitates regeneration of sulphur contaminated components, such as the first selective catalytic reduction catalyst $SCR_1$ combined with an oxidizing coating in the outlet part on the same substrate $SCR_{1\_komb}$, and/or components arranged downstream of the latter. At regeneration of the sulphur contaminated components, the amount of sulphur which is stored in the components is reduced, that is to say in at least one of the first selective catalytic reduction catalyst $SCR_1$ combined with an oxidizing coating in the outlet part on the same substrate $SCR_{1\_komb}$, and components arranged downstream of the latter.

According to one configuration according to the invention, the exhaust treatment system has the structure $SC_1$-cDPF-$SCR_2$. That is to say, the exhaust treatment system 350 comprises a first slip-catalyst $SC_1$, followed downstream by a particulate filter with an at least partly catalytically oxidizing coating cDPF, followed downstream by a second selective catalytic reduction catalyst $SCR_2$. Here as well, because of the use of both the first slip-catalyst $SC_1$ and the second selectively catalytic reduction catalyst $SCR_2$, the second slip-catalyst $SC_2$ may be omitted from the exhaust treatment system 350 for certain applications. The use of the first slip-catalyst $SC_1$ facilitates a reduction of the starting temperature (the "light-off" temperature) for the $NO_x$-reduction.

According to one embodiment of the present invention, the first reduction catalyst device 331 here comprises only a slip-catalyst $SC_1$, which is multifunctional and both reduces nitrogen oxides $NO_x$ through the use of the additive and also oxidizes the additive. This entails a number of advantages for the exhaust treatment system. Tests have shown that the reduction of nitrogen oxides $NO_x$ with the first multifunctional slip-catalyst $SC_1$ in the first catalyst device 331 becomes surprisingly efficient. This is a result of sufficient amounts of nitrogen oxides $NO_x$ being present in the exhaust stream 303 at the first slip-catalyst $SC_1$ in the first catalyst device 331, in order for an efficient reduction of nitrogen oxides $NO_x$ to be obtained. In other words, the relatively good availability of nitrogen oxides $NO_x$ at the first slip-catalyst $SC_1$ is used to achieve a very good performance, and/or a very good utilization, when a multifunctional slip-catalyst $SC_1$ is used in the first catalyst device 331.

The first slip-catalyst $SC_1$ may be used with the objective of generating heat, for example by oxidation of hydrocarbons HC in the exhaust stream, which also may facilitate regeneration of sulphur contaminated components, such as the catalyst and/or components arranged downstream of the latter. At the regeneration of the sulphur contaminated components, the amount of sulphur stored in the components is reduced.

According to one configuration according to the invention, the exhaust treatment system has the structure $SC_1$-cDPF-$SCR_2$-$SC_2$. That is to say, the exhaust treatment system 350 comprises a first slip-catalyst $SC_1$, followed downstream by a particulate filter with an at least partly catalytically oxidizing coating cDPF, followed downstream by a second selective catalytic reduction catalyst $SCR_2$, followed downstream by a second slip-catalyst $SC_2$. This exhaust treatment system 350 facilitates emission levels for nitrogen oxides $NO_x$ close to zero, since the second reduction catalyst $SCR_2$ may be made to work hard, that is to say with a relatively high dosage of the second additive, since it is followed downstream by the second slip-catalyst $SC_2$. The use of the second slip-catalyst $SC_2$ results in additionally improved performance for the system, since additional slip may be taken care of by the second slip-catalyst $SC_2$. The use of the first slip-catalyst $SC_1$ facilitates a reduction of the starting temperature (the "light-off" temperature) for the $NO_x$-reduction.

According to one embodiment of the present invention, the first reduction catalyst device 331 here comprises only a slip-catalyst $SC_1$, which is multifunctional and both reduces nitrogen oxides $NO_x$ through the use of the additive and also oxidizes the additive (as described above). This entails a number of advantages for the exhaust treatment system. Tests have shown that the reduction of nitrogen oxides $NO_x$ with the first multifunctional slip-catalyst $SC_1$ in the first catalyst device 331 becomes surprisingly efficient. This is a result of sufficient amounts of nitrogen oxides $NO_x$ being present in the exhaust stream 303 at the first slip-catalyst $SC_1$ in the first catalyst device 331, in order for an efficient reduction of nitrogen oxides $NO_x$ to be obtained. In other words, the relatively good availability of nitrogen oxides $NO_x$ at the first slip-catalyst $SC_1$ is used to achieve a very good performance, and/or a very good utilization, when a multifunctional slip-catalyst $SC_1$ is used in the first catalyst device 331. The first slip-catalyst $SC_1$ may be used with the objective of generating heat, for example by oxidation of hydrocarbons HC in the exhaust stream, which also facilitates regeneration of sulphur contaminated components, such as the catalyst and/or components arranged downstream of the latter. At the regeneration of the sulphur contaminated components, the amount of sulphur stored in the components is reduced.

According to one configuration according to the invention, the exhaust treatment system has the structure $SC_1$-$SCR_1$-cDPF-$SCR_2$. That is to say, the exhaust treatment system 350 comprises a first slip-catalyst $SC_1$, followed downstream by a first selective catalytic reduction catalyst $SCR_1$, followed downstream by a particulate filter with an at least partly catalytically oxidizing coating cDPF, followed downstream by a second selective catalytic reduction catalyst $SCR_2$. As mentioned above, the use of both the first selectively catalytic reduction catalyst $SCR_1$ and the second selectively catalytic reduction catalyst $SCR_2$ in the exhaust treatment system 350 facilitates the omission of a second slip-catalyst $SC_2$ in the exhaust treatment system 350 for some applications, which reduces the manufacturing cost for the vehicle. The use of the first slip-catalyst $SC_1$ facilitates a greater load, and therefore a better use of the first selective catalytic reduction catalyst $SCR_1$, and also facilitates a reduction of the starting temperature (the "light off"-temperature) for the $NO_x$-reduction.

According to one embodiment of the present invention, the first reduction catalyst device 331 comprises a slip-catalyst $SC_1$, which is multifunctional and accordingly both reduces nitrogen oxides $NO_x$ through the use of the additive, and also oxidizes the additive (as described above), which results in a number of advantages for the exhaust treatment system. The first slip-catalyst $SC_1$ may here be used in symbiosis with the first reduction catalyst $SCR_1$, so that the activity of the first slip-catalyst $SC_1$ with respect to reduction of nitrogen oxides $NO_x$ and oxidation of additive, as well as the slip-catalyst's $SC_1$ deposition characteristics for the reductant, constitute a complement to the function of the first reduction catalyst $SCR_1$. The combination of these characteristics for the first reduction catalyst device 331, comprising the first reduction catalyst $SCR_1$ and the first slip-catalyst $SC_1$, means that a higher conversion level may be obtained over the first reduction catalyst device 331. In addition, the use of the first slip-catalyst $SC_1$ in the first reduction catalyst device 331 results in conditions making it possible to avoid a non-selective oxidation of reductant occurring in components placed downstream of the first reduction catalyst device 331 in the exhaust treatment system, which may potentially comprise platinum metals.

Furthermore, tests have shown that the reduction of nitrogen oxides $NO_x$ with the first multifunctional slip-catalyst $SC_1$ in the first catalyst device 331 becomes surprisingly efficient. This is a result of sufficient amounts of nitrogen oxides $NO_x$ being present in the exhaust stream in the first catalyst device 331, at the first slip-catalyst $SC_1$ in the first catalyst device 331, in order for an efficient reduction of nitrogen oxides $NO_x$ to be obtained. In other words, the relatively good availability of nitrogen oxides $NO_x$ at the first slip-catalyst $SC_1$ is used to achieve a very good performance, and/or a very good utilization, when a multifunctional slip-catalyst $SC_1$ is used in the first catalyst device 331.

The first selective catalytic reduction catalyst $SCR_1$, the first slip-catalyst $SC_1$, and/or the additional first slip-catalyst $SC_{1b}$, may be used with the objective of generating heat, for example by oxidation of hydrocarbons HC in the exhaust stream, which facilitates regeneration of sulphur contaminated components, such as the catalyst and/or components arranged downstream of the latter. At the regeneration of the sulphur contaminated components, the amount of sulphur stored in the components is reduced. The use of the first slip-catalyst $SC_1$ upstream of the first selective catalytic reduction catalyst $SCR_1$ results in good possibilities for generating this heat.

According to one configuration according to the invention, the exhaust treatment system has the structure $SC_1$-$SCR_1$-cDPF-$SCR_2$-$SC_2$. That is to say, the exhaust treatment system 350 comprises a first slip-catalyst $SC_1$, followed downstream by a first selective catalytic reduction catalyst $SCR_1$, followed downstream by a particulate filter with an at least partly catalytically oxidizing coating cDPF, followed downstream by a second selective catalytic reduction catalyst $SCR_2$, followed downstream by a second slip-catalyst $SC_2$. This exhaust treatment system 350 facilitates emission levels for nitrogen oxides $NO_x$ close to zero, since the second reduction catalyst $SCR_2$ may be made to work hard, for example by increased dosage of the second additive, since it is followed downstream by the second slip-catalyst $SC_2$. The use of the first slip-catalyst $SC_1$ also facilitates a reduction of the starting temperature (the "light-off"-temperature) for the $NO_x$-reduction, and may also result in a greater load, and thus an improved utilization of the first selective catalytic reduction catalyst $SCR_1$. The use of the second slip-catalyst $SC_2$ results in additionally improved performance for the system, since additional slip may be taken care of by the second slip-catalyst $SC_2$.

According to one embodiment of the present invention, the first reduction catalyst device 331 comprises a slip-catalyst $SC_1$, which is multifunctional and accordingly both reduces nitrogen oxides $NO_x$ through the use of the additive, and also oxidizes the additive (as described above), which results in a number of advantages for the exhaust treatment system. The first slip-catalyst $SC_1$ may here be used in symbiosis with the first reduction catalyst $SCR_1$, so that the activity of the first slip-catalyst $SC_1$ with respect to reduction of nitrogen oxides $NO_x$ and oxidation of additive, as well as the slip-catalyst's $SC_1$ deposition characteristics for the reductant, constitute a complement to the function of the first reduction catalyst $SCR_1$. The combination of these characteristics for the first reduction catalyst device 331, comprising the first reduction catalyst $SCR_1$ and the first slip-catalyst $SC_1$, means that a higher conversion level may be obtained over the first reduction catalyst device 331. In addition, the use of the first slip-catalyst $SC_1$ in the first reduction catalyst device 331 results in conditions making it possible to avoid a non-selective oxidation of reductant occurring in components placed downstream of the first reduction catalyst device 331 in the exhaust treatment system, which may potentially comprise platinum metals.

Furthermore, tests have shown that the reduction of nitrogen oxides $NO_x$ with the first multifunctional slip-catalyst $SC_1$ in the first catalyst device 331 becomes surprisingly efficient. This is a result of sufficient amounts of nitrogen oxides $NO_x$ being present in the exhaust stream 303 at the first slip-catalyst $SC_1$ in the first catalyst device 331, in order for an efficient reduction of nitrogen oxides $NO_x$ to be obtained. In other words, the relatively good availability of nitrogen oxides $NO_x$ at the first slip-catalyst $SC_1$ is used to achieve a very good performance, and/or a very good utilization, when a multifunctional slip-catalyst $SC_1$ is used in the first catalyst device 331.

The first selective catalytic reduction catalyst $SCR_1$, and/or the first slip-catalyst $SC_1$, may be used with the objective of generating heat, for example through oxidation of hydrocarbons HC in the exhaust stream, which facilitates regeneration of sulphur contaminated components, such as the catalyst and/or components arranged downstream of the latter. At the regeneration of the sulphur contaminated components, the amount of sulphur stored in the components is reduced. The use of the first slip-catalyst $SC_1$ upstream of the first selective catalytic reduction catalyst $SCR_1$ results in good possibilities for generating this heat.

According to one configuration according to the invention, the exhaust treatment system has the structure $SC_1$-$SCR_1$-$SC_{1b}$-cDPF-$SCR_2$. That is to say, the exhaust treatment system 350 comprises a first slip-catalyst $SC_1$, followed downstream by a first selective catalytic reduction catalyst $SCR_1$, followed downstream by an additional first slip-catalyst $SC_{1b}$, followed downstream by a particulate filter with an at least partly catalytically oxidizing coating cDPF, followed downstream by a second selective catalytic reduction catalyst $SCR_2$. As mentioned above, the use of both the first selectively catalytic reduction catalyst $SCR_1$ and the second selectively catalytic reduction catalyst $SCR_2$ in the exhaust treatment system 350, facilitates the omission of a second slip-catalyst $SC_2$ in the exhaust treatment system 350 for some applications, which reduces the manufacturing cost for the vehicle. The use of the first slip-catalyst $SC_1$ and the additional first slip-catalyst $SC_{1b}$ facilitates a greater load, and therefore a better use of the first selective catalytic reduction catalyst $SCR_1$, and also facilitates a reduction of the starting temperature (the "light off"-temperature) for the $NO_x$-reduction.

According to one embodiment of the present invention, the first reduction catalyst device 331 here comprises a slip-catalyst $SC_1$ and an additional first slip-catalyst $SC_{1b}$, of which at least one is multifunctional, and accordingly reduces nitrogen oxides $NO_x$ through the use of the additive, and also oxidizes the additive (as described above). This entails a number of advantages for the exhaust treatment system. The first slip-catalyst $SC_1$ and/or the additional first slip-catalyst $SC_{1b}$ may here be used in symbiosis with the first reduction catalyst $SCR_1$, so that the activity of the first slip-catalyst $SC_1$ and/or the additional first slip-catalyst $SC_{1b}$, with respect to the reduction of nitrogen oxides $NO_x$ and oxidation of additive, as well as the slip-catalyst's $SC_1$ and/or the additional first slip-catalyst $SC_{1b}$ deposit characteristics for reductant, constitute a complement to the function of the first reduction catalyst $SCR_1$. The combination of these characteristics for the first reduction catalyst device 331, comprising the first reduction catalyst $SCR_1$, the first slip-catalyst $SC_1$, and the additional first slip-catalyst $SC_{1b}$, means that a higher conversion level may be obtained over the first reduction catalyst device 331. Additionally, the use of the first slip-catalyst $SC_1$, and/or the additional first slip-catalyst $SC_{1b}$, in the first reduction catalyst device 331 result in conditions making it possible to avoid a non-selective oxidation of reductant occurring in components placed downstream of the first reduction catalyst device 331 in the exhaust treatment system, which may potentially comprise platinum metals.

Furthermore, tests have shown that the reduction of nitrogen oxides $NO_x$ with the first multifunctional slip-catalyst $SC_1$, and/or the multifunctional additional first slip-catalyst $SC_{1b}$, in the first catalyst device 331 becomes surprisingly efficient. This is a result of sufficient amounts of nitrogen oxides $NO_x$ being present in the exhaust stream at the first slip-catalyst $SC_1$, and/or at the additional first slip-catalyst $SC_{1b}$, in the first catalyst device 331, in order for an efficient reduction of nitrogen oxides $NO_x$ to be obtained. In other words, the relatively good availability of nitrogen oxides $NO_x$ at the first slip-catalyst $SC_1$, and/or at the additional first slip-catalyst $SC_{1b}$, may be used to achieve a very good performance, and/or a very good utilization, when a multifunctional slip-catalyst $SC_1$, and/or a multifunctional additional first slip-catalyst $SC_{1b}$ is used in the first catalyst device 331.

The first selective catalytic reduction catalyst $SCR_1$, the first slip-catalyst $SC_1$, and/or the additional first slip-catalyst $SC_{1b}$, may be used with the objective of generating heat, for example by oxidation of hydrocarbons HC in the exhaust stream, which facilitates regeneration of sulphur contaminated components, such as the catalyst and/or components arranged downstream of the latter. At the regeneration of the sulphur contaminated components, the amount of sulphur stored in the components is reduced. The use of the first slip-catalyst $SC_1$ upstream of the first selective catalytic reduction catalyst $SCR_1$ results in good possibilities for generation this heat.

According to one configuration according to the invention, the exhaust treatment system has the structure $SC_1$-$SCR_1$-$SC_{1b}$-cDPF-$SCR_2$-$SC_2$. That is to say, the exhaust treatment system 350 comprises a first slip-catalyst $SC_1$, followed downstream by a first selective catalytic reduction catalyst $SCR_1$, followed downstream by an additional first slip-catalyst $SC_{1b}$, followed downstream by a particulate filter with an at least partly catalytically oxidizing coating cDPF, followed downstream by a second selective catalytic reduction catalyst $SCR_2$, followed downstream by a second slip-catalyst $SC_2$. This exhaust treatment system 350 facilitates emission levels for nitrogen oxides $NO_x$ close to zero, since the second reduction catalyst $SCR_2$ may be made to work hard, for example by increased dosage of the second additive, since it is followed downstream by the second slip-catalyst $SC_2$. The use of the second slip-catalyst $SC_2$ results in additionally improved performance for the system, since additional slip may be taken care of by the second slip-catalyst $SC_2$. The use of the first slip-catalyst $SC_1$, and the additional first slip-catalyst $SC_{1b}$, also facilitates a reduction of the starting temperature (the "light off"-temperature) for the $NO_x$-reduction, and may also result in a larger load, and thus in an improved use of the first selective catalytic reduction catalyst $SCR_1$.

According to one embodiment of the present invention the first reduction catalyst device 331 here comprises a slip-catalyst $SC_1$, and/or an additional first slip-catalyst $SC_{1b}$, which is multifunctional, and accordingly reduces nitrogen oxides $NO_x$ through the use of the additive, and also oxidizes the additive (as described above). This entails a number of advantages for the exhaust treatment system. The first slip-catalyst $SC_1$, and/or the additional first slip-catalyst $SC_{1b}$, may here be used in symbiosis with the first reduction catalyst $SCR_1$, so that the activity of the first slip-catalyst $SC_1$, and/or the additional first slip-catalyst $SC_{1b}$, with respect to the reduction of nitrogen oxides $NO_x$ and oxidation of additive, as well as the slip-catalyst's $SC_1$ and/or the additional first slip-catalyst's $SC_{1b}$ deposit characteristics for reductant, constitute a complement to the function of the first reduction catalyst $SCR_1$. The combination of these characteristics for the first reduction catalyst device 331, comprising the first reduction catalyst $SCR_1$, the first slip-catalyst $SC_1$, and the additional first slip-catalyst $SC_{1b}$, means that a higher conversion level may be obtained over the first reduction catalyst device 331. Additionally, the use of the first slip-catalyst $SC_1$, and/or of the additional first slip-catalyst $SC_{1b}$, in the first reduction catalyst device 331 result in conditions making it possible to avoid a non-selective oxidation of reductant occurring in components placed downstream of the first reduction catalyst device 331 in the exhaust treatment system, which may potentially comprise platinum metals.

Furthermore, tests have shown that the reduction of nitrogen oxides $NO_x$ with the first multifunctional slip-catalyst $SC_1$, and/or the additional first slip-catalyst $SC_{1b}$, in the first catalyst device 331 becomes surprisingly efficient. This is a result of sufficient amounts of nitrogen oxides $NO_x$ being present in the exhaust stream 303 at the first slip-catalyst $SC_1$, and/or at the additional first slip-catalyst $SC_{1b}$, in the first catalyst device 331, in order for an efficient reduction of nitrogen oxides $NO_x$ to be obtained. In other words, the relatively good availability of nitrogen oxides $NO_x$ at the first slip-catalyst $SC_1$, and/or at the additional first slip-catalyst $SC_{1b}$, may be used to achieve a very good performance, and/or a very good utilization, when a multifunctional slip-catalyst $SC_1$ and/or a multifunctional additional first slip-catalyst $SC_{1b}$ is used in the first catalyst device 331.

The first selective catalytic reduction catalyst $SCR_1$, the first slip-catalyst $SC_1$, and/or the additional first slip-catalyst $SC_{1b}$, may be used with the objective of generating heat, for example by oxidation of hydrocarbons HC in the exhaust stream, which facilitates regeneration of sulphur contaminated components, such as the catalyst and/or components arranged downstream of the latter. At the regeneration of the sulphur contaminated components, the amount of sulphur stored in the components is reduced. The use of the first slip-catalyst $SC_1$ upstream of the first selective catalytic reduction catalyst $SCR_1$ results in good possibilities for generating this heat.

According to one configuration according to the invention, the exhaust treatment system has the structure $SC_1$-$SCR_{1\_komb}$-cDPF-$SCR_2$. That is to say, the exhaust treatment system 350 comprises a first slip-catalyst $SC_1$, followed downstream by a first selective catalytic reduction catalyst, combined with an oxidizing coating in the outlet part on the same substrate $SCR_{1\_komb}$, followed downstream by a particulate filter with an at least partly catalytically oxidizing coating cDPF, followed downstream by a second selective catalytic reduction catalyst $SCR_2$. As mentioned above, the use of both the first selectively catalytic reduction catalyst $SCR_{1\_komb}$, and the second selectively catalytic reduction catalyst $SCR_2$, in the exhaust treatment system 350 facilitates that a second slip-catalyst $SC_2$ may be omitted from the exhaust treatment system 350 for some applications, which reduces the manufacturing cost for the vehicle. The use of the first slip-catalyst $SC_1$ facilitates a greater load, and thus a better use of the first selective catalytic reduction catalyst $SCR_1$, and also facilitates a reduction of the starting temperature (the "light off"-temperature) for the $NO_x$-reduction. Additionally, the use of the first slip-catalyst $SC_1$ upstream of the first selective catalytic reduction catalyst $SCR_1$ combined with an oxidizing coating in the outlet part on the same substrate, provides for a possibility of regeneration of sulphur contaminated components, such as the catalyst and/or components arranged downstream of the latter. At the regeneration of the sulphur contaminated components, the amount of sulphur stored in the components is reduced. Such a regeneration may for example be used when the first selective catalytic reduction catalyst combined with an oxidizing coating in the outlet part $SCR_{1\_komb}$, comprises copper.

According to one embodiment of the present invention, the first reduction catalyst device 331 comprises a slip-catalyst $SC_1$, which is multifunctional and accordingly both reduces nitrogen oxides $NO_x$ through the use of the additive, and also oxidizes the additive (as described above), which results in a number of advantages for the exhaust treatment system. The first slip-catalyst $SC_1$ may here be used in symbiosis with the first reduction catalyst $SCR_{1\_komb}$, so that the activity of the first slip-catalyst $SC_1$ with respect to reduction of nitrogen oxides $NO_x$ and oxidation of additive, as well as the slip-catalyst's $SC_1$ deposit characteristics for reductant, constitutes a complement to the function for the first reduction catalyst $SCR_{1\_komb}$. The combination of these characteristics for the first reduction catalyst device 331, comprising the first reduction catalyst $SCR_{1\_komb}$ and the first slip-catalyst $SC_1$, means that a higher conversion level may be obtained over the first reduction catalyst device 331. In addition, the use of the first slip-catalyst $SC_1$ in the first reduction catalyst device 331 results in conditions making it possible to avoid a non-selective oxidation of reductant occurring in components placed downstream of the first reduction catalyst device 331 in the exhaust treatment system, which may potentially comprise platinum metals.

Furthermore, tests have shown that the reduction of nitrogen oxides $NO_x$ with the first multifunctional slip-catalyst $SC_1$ in the first catalyst device 331 becomes surprisingly efficient. This is a result of sufficient amounts of nitrogen oxides $NO_x$ being present in the exhaust stream 303 at the first slip-catalyst $SC_1$ in the first catalyst device 331, in order for an efficient reduction of nitrogen oxides $NO_x$ to be obtained. In other words, the relatively good availability of nitrogen oxides $NO_x$ at the first slip-catalyst $SC_1$ is used to achieve a very good performance, and/or a very good utilization, when a multifunctional slip-catalyst is used in the first catalyst device 331.

The first selective catalytic reduction catalyst combined with an oxidizing coating in the outlet part on the same substrate $SCR_{1\_komb}$, and/or the first slip-catalyst $SC_1$, may be used with the objective of generating heat, for example through oxidation of hydrocarbons HC in the exhaust stream, which facilitates regeneration of sulphur contaminated components, such as the catalyst and/or components arranged downstream of the latter. At the regeneration of the sulphur contaminated components, the amount of sulphur stored in the components is reduced. The use of the first slip-catalyst $SC_1$ upstream of the first selective catalytic reduction catalyst combined with an oxidizing coating in the outlet part on the same substrate $SCR_{1\_komb}$, results in good possibilities for generating heat.

According to one configuration according to the invention, the exhaust treatment system has the structure $SC_1$-$SCR_{1\_komb}$-cDPF-$SCR_2$-$SC_2$. That is to say, the exhaust treatment system 350 comprises a first slip-catalyst $SC_1$, followed downstream by a first selective catalytic reduction catalyst combined with an oxidizing coating in the outlet part on the same substrate $SCR_{1\_komb}$, followed downstream by a particulate filter with an at least partly catalytically oxidizing coating cDPF, followed downstream by a second selective catalytic reduction catalyst $SCR_2$, followed downstream by a second slip-catalyst $SC_2$. This exhaust treatment system 350 facilitates emission levels for nitrogen oxides $NO_x$ close to zero, since the second reduction catalyst $SCR_2$ may be made to work hard, for example by increased dosage of the second additive, since it is followed downstream by the second slip-catalyst $SC_2$. The use of the second slip-catalyst $SC_2$ results in additionally improved performance for the system, since additional slip may be taken care of by the second slip-catalyst $SC_2$. The use of the first slip-catalyst $SC_1$ facilitates a greater load, and therefore a better use of the first selective catalytic reduction catalyst $SCR_1$, and also facilitates a reduction of the starting temperature (the "light off"-temperature) for the $NO_x$-reduction. Additionally, the use of the first slip-catalyst $SC_1$ upstream of the first selective catalytic reduction catalyst combined with an oxidizing coating in the outlet part on the same substrate $SCR_{1\_komb}$, provides for a possibility of regeneration of sulphur contaminated components, such as the catalyst and/or components arranged downstream of the latter. At the regeneration of the sulphur contaminated components, the amount of sulphur stored in the components is reduced. Such a regeneration may for example be used, when the first selective catalytic reduction catalyst combined with an oxidizing coating in the outlet part $SCR_{1\_komb}$ comprises copper.

According to one embodiment of the present invention, the first reduction catalyst device 331 comprises a slip-catalyst $SC_1$, which is multifunctional and accordingly both reduces nitrogen oxides $NO_x$ through the use of the additive, and also oxidizes the additive (as described above), which results in a number of advantages for the exhaust treatment system. The first slip-catalyst $SC_1$ may here be used in symbiosis with the first reduction catalyst $SCR_{1\_komb}$, so that the activity of the first slip-catalyst $SC_1$ with respect to reduction of nitrogen oxides $NO_x$ and oxidation of additive, as well as the slip-catalyst's $SC_1$ deposit characteristics for reductant, constitute a complement to the function for the first reduction catalyst $SCR_{1\_komb}$. The combination of these characteristics for the first reduction catalyst device 331, comprising the first reduction catalyst $SCR_{1\_komb}$ and the first slip-catalyst $SC_1$, means that a higher conversion level may be obtained over the first reduction catalyst device 331. In addition, the use of the first slip-catalyst $SC_1$ in the first reduction catalyst device 331 results in conditions making it possible to avoid a non-selective oxidation of reductant occurring in components placed downstream of the first reduction catalyst device 331 in the exhaust treatment system, which may potentially comprise platinum metals.

Furthermore, tests have shown that the reduction of nitrogen oxides $NO_x$ with the first multifunctional slip-catalyst $SC_1$ in the first catalyst device 331 becomes surprisingly efficient. This is a result of sufficient amounts of nitrogen oxides $NO_x$ being present in the exhaust stream 303 at the first slip-catalyst $SC_1$ in the first catalyst device 331, in order for an efficient reduction of nitrogen oxides $NO_x$ to be obtained. In other words, the relatively good availability of nitrogen oxides $NO_x$ at the first slip-catalyst $SC_1$ is used to achieve a very good performance, and/or a very good utilization, when a multifunctional slip-catalyst is used in the first catalyst device 331.

The first selective catalytic reduction catalyst combined with an oxidizing coating in the outlet part on the same substrate $SCR_{1\_komb}$, and/or the first slip-catalyst $SC_1$, may be used with the objective of generating heat, for example through oxidation of hydrocarbons HC in the exhaust stream, which facilitates regeneration of sulphur contaminated components, such as the catalyst and/or components arranged downstream of the latter. At the regeneration of the sulphur contaminated components, the amount of sulphur stored in the components is reduced. The use of the first slip-catalyst $SC_1$ upstream of the first selective catalytic reduction catalyst combined with an oxidizing coating in the outlet part on the same substrate $SCR_{1\_komb}$, results in good possibilities for generating heat.

In the configurations listed above according to the embodiments, as described above, the first reduction catalyst $SCR_1/SCR_{1\_komb}$ and the first slip-catalyst $SC_1$ may consist of an integrated unit, comprising both $SCR_1/SCR_{1\_komb}$ and $SC_1$, or may consist of separate units for $SCR_1/SCR_{1\_komb}$ and $SC_1$.

In the configurations listed above according to the embodiments, as described above, the first reduction catalyst $SCR_1$, the first slip-catalyst $SC_1$, and the additional first slip-catalyst $SC_{1b}$, may comprise an integrated unit comprising two or all of $SCR_1$, $SC_1$ and $SC_{1b}$, or may consist of separate units for $SCR_1$, $SC_1$ and $SC_{1b}$.

Similarly, the first reduction catalyst device 331 and the particulate filter cDPF may consist of an integrated unit, comprising both the first reduction catalyst device 331 and the particulate filter cDPF, or may consist of separate units for the first reduction catalyst device 331 and the filter cDPF.

Similarly, the second reduction catalyst $SCR_2$ and the second slip-catalyst $SC_2$ may either consist of an integrated unit, comprising both $SCR_2$ and $SC_2$, or may consist of separate units for $SCR_2$ and $SC_2$.

Similarly, the first slip-catalyst $SC_1$ and cDPF 320 may constitute at least partly integrated units, or comprise separate units.

According to one embodiment of the present invention, the exhaust treatment system 350 comprises a system 370 for supply of additive, which comprises at least one pump 373 arranged to supply the first 371 and the second 372 dosage devices with additive, that is to say, for example, ammonia or urea.

The system 370 supplies, according to one embodiment, at least one of the first 371 and the second 372 dosage devices with additive in liquid form. Additive in liquid form may be filled up at many filling stations/petrol stations where fuel is provided, so that the additive may be refilled, and accordingly an optimized use of the two reduction steps in the exhaust treatment system may be ensured, wherein the optimized use may, for example, entail that both the first and the second dosage device may be used for dosage at different types of operation. The optimized use is then, for example, not limited to the first dosage device being used only at cold starts. Today, there are thus already existing distribution networks for liquid additives, ensuring availability of additive where the vehicle is driven.

Additionally, the vehicle needs only to be completed with an additional dosage device, the first 371 dosage device, if only liquid additive is available for use. Accordingly, added complexity is minimized through the use of only liquid additive. If, for example, gaseous additive is also used, in addition to the liquid additive, the exhaust treatment system needs to be used with a complete system for supply of the gaseous additive. In addition, a distribution network and/or logistics for supply of the gaseous additive needs to be built.

The total exhaust treatment system's secondary emission of, for example, ammonia $NH_3$, nitrogen dioxides $NO_2$, and/or laughing gas $N_2O$ at ordinary operation of the combustion engine, that is to say not only at cold starts, may through the use of one embodiment of the present invention be reduced, by way of the additive being administered at both the first 371 and the second 372 dosage device. This presumes, however, that it is possible to provide a substantially continuous dosage at the use of the embodiment. By using additive in liquid form, the additive lasts longer without interruption for service, since additive in liquid form is available for purchase at ordinary petrol stations. Accordingly, substantially continuous dosage with both the first 371 and the second 372 dosage device may be made during the entire normal service intervals for a vehicle.

The possibility of continuous dosage with both the first 371 and second 372 dosage device means that the exhaust treatment system may be used to its full potential. Thus, the system may be controlled, so that robust and very high total levels of $NO_x$-conversion may be obtained over time, without the system having to compensate for running out of additive. The secured availability of additive also means that a reliable control of the $NO_2$-level $NO_2/NO_x$ may always be carried out, that is to say during the entire service interval.

Using additive in liquid form for dosage with both the first 371 and the second 372 dosage device, means that the complexity of the system 370 is kept low, since a joint tank may be used for storage of the additive. Additive in liquid form may be filled up at many filling stations/petrol stations where fuel is provided, so that the additive may be refilled, and accordingly an optimized use of the two reduction steps in the exhaust treatment system may be ensured.

According to another embodiment, the system 370 supplies at least one of the first 371 and the second 372 dosage devices with additive in gaseous form. According to one embodiment this additive may consist of hydrogen $H_2$.

One example of such a system 370 for supply of additive is shown schematically in FIG. 3, where the system comprises the first dosage device 371 and the second dosage device 372, which are arranged upstream of the first reduction catalyst 331, and upstream of the second reduction catalyst 332, respectively. The first and second dosage devices 371, 372, often consisting of dosage nozzles which administer additive to, and mix such additive with, the exhaust stream 303, are supplied with additive by the at least one pump 373, via conduits 375 for additive. The at least one pump 373 obtains additive from one or several tanks 376 for additive, via one or several conduits 377 between the tank/tanks 376, and the at least one pump 373. It should be realized here that the additive may be in liquid form and/or gaseous form, as described above. Where the additive is in liquid form, the pump 373 is a liquid pump and the one or several tanks 376 are liquid tanks. Where the additive is in gaseous form, the pump 373 is a gas pump, and the one or several tanks 376 are gas tanks. If both gaseous and liquid additives are used, several tanks and pumps are arranged, wherein at least one tank and one pump are set up to supply liquid additive, and at least one tank and one pump are set up to supply gaseous additive.

According to one embodiment of the invention, the at least one pump 373 comprises a joint pump, which feeds both the first 371 and the second 372 dosage device with the first and the second additive, respectively. According to another embodiment of the invention, the at least one pump comprises a first and a second pump, which feed the first 371 and the second 372 dosage device, respectively, with the first and the second additive, respectively. The specific function of the additive system 370 is well described in prior art technology, and the exact method for the injection of additive is therefore not described in any further detail herein. Generally, however, the temperature at the point of injection/SCR-catalyst should be above a lower threshold temperature to avoid precipitates and formation of unwanted by-products, such as ammonium nitrate $NH_4NO_3$. An example of a value for such a lower threshold temperature may be approximately 200° C. According to one embodiment of the invention, the system 370 for supply of additive comprises a dosage control device 374, arranged to control the at least one pump 373, so that the additive is supplied to the exhaust stream. The dosage control device 374 comprises, according to one embodiment, a first pump control device 378 arranged to control the at least one pump 373, in such a manner that a first dosage of the first additive is supplied to the exhaust stream 303, via the first dosage device 371. The dosage control device 374 also comprises a second pump control device 379, arranged to control the at least one pump 373, so that a second dosage of the second additive is supplied to the exhaust stream 303, via the second dosage device 372.

The first and second additives usually consist of the same type of additive, for example urea. However, according to one embodiment of the present invention, the first additive and the second additive may be of different types, for example urea and ammonia, which means that the dosage to each one of the first 331 and second 332 reduction catalyst devices, and accordingly also the function for each of the first 331 and second 332 reduction catalyst devices, may be optimized also with respect to the type of additive. If different types of additive are used, the tank 376 comprises several sub-tanks, which contain the different respective types of additive. One or several pumps 373 may be used to supply the different types of additive to the first dosage device 371 and the second dosage device 372. As mentioned above, the one or several tanks, and the one or several pumps, are adapted according to the state of the additive, that is to say according to whether the additive is gaseous or liquid.

The one or several pumps 373 are thus controlled by a dosage control device 374, which generates control signals for the control of supply of additive, so that a desired amount is injected into the exhaust stream 303 with the help of the first 371 and the second 372 dosage device, respectively, upstream of the first 331 and the second 332 reduction catalyst device, respectively. In more detail, the first pump control device 378 is arranged to control either a joint pump, or a pump dedicated to the first dosage device 371, so that the first dosage is controlled to be supplied to the exhaust stream 303 via the first dosage device 371. The second pump control device 379 is arranged to control either a joint pump, or a pump dedicated to the second dosage device 372, so that the second dosage is controlled to be supplied to the exhaust stream 303 via the second dosage device 372.

Figure 4:
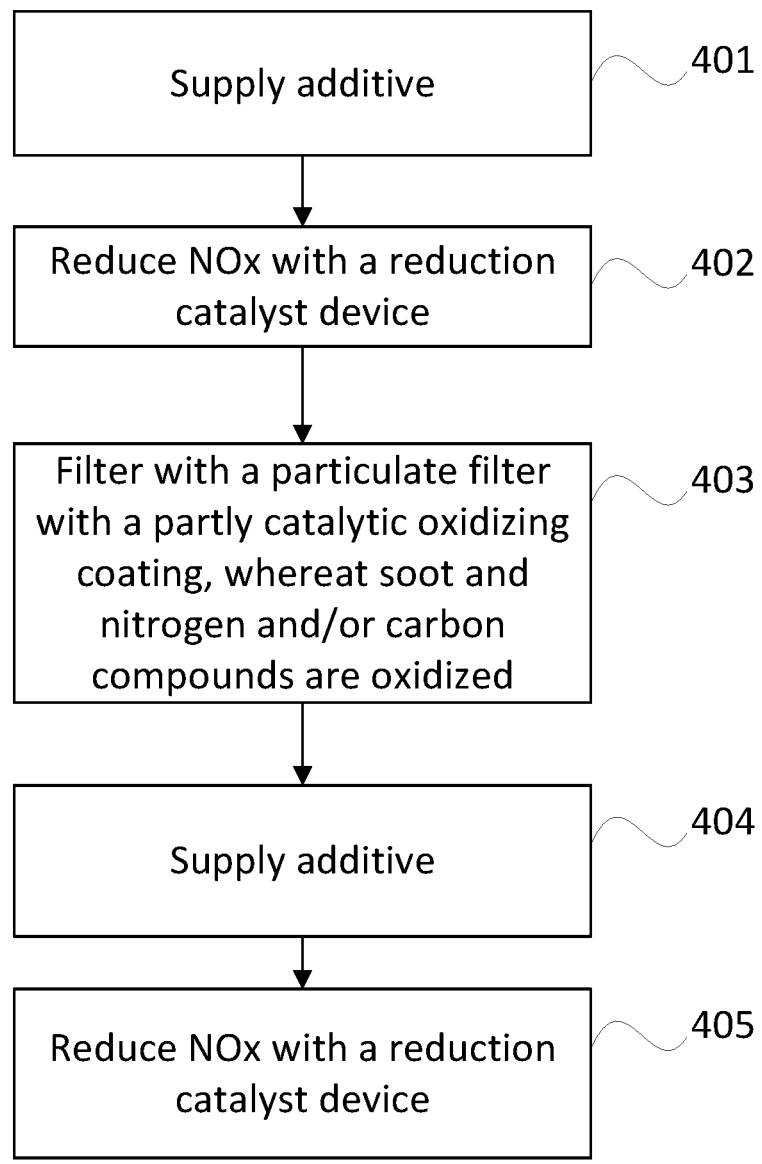
FIG. 4 shows a flow chart for the method for exhaust treatment according to the invention.

According to one aspect of the present invention, a method is provided for the treatment of an exhaust stream 303, which is emitted by a combustion engine 301. This method is described herein with the help of FIG. 4, in which the method steps follow the flow of the exhaust stream through the exhaust treatment system 350.

In a first step 401 of the method, the exhaust stream is supplied with a first additive with the use of a first dosage device 371. In a second step 402 of the method, a reduction of nitrogen oxides $NO_x$ is carried out in the exhaust stream with the use of this first additive, in a first reduction catalyst device 331, which may comprise a first selective catalytic reduction catalyst $SCR_1$, and/or a first slip-catalyst $SC_1$, and/or the above described $SCR_{1\_komb}$, and/or the additional first slip-catalyst $SC_{1b}$, arranged downstream of the first dosage device 371. The first slip-catalyst $SC_1$, and/or the additional first slip-catalyst $SC_{1b}$, here oxidises a residue of the additive, wherein such residue may consist for example of urea, ammonia $NH_3$, or isocyanic acid HNCO, and/or provides an additional reduction of nitrogen oxides $NO_x$ in the exhaust stream 303. It should be noted that the reduction of nitrogen oxides $NO_x$ with the first reduction catalyst device 331 in this document may comprise partial oxidation, as long as the total reaction constitutes a reduction of nitrogen oxides $NO_x$.

In a third step 403 of the method, the exhaust stream is filtered, so that soot particles are caught up by a particulate filter 320, which at least partly comprises a catalytically oxidizing coating. This catalytically oxidizing coating oxidizes the caught soot particles, and one or several incompletely oxidized nitrogen and/or carbon compounds.

In a fourth step 404 of the method, a second additive is supplied to the exhaust stream 303 with the use of a second dosage device 372. In a fifth step 405 of the method, a reduction of the nitrogen oxides $NO_x$ in the exhaust stream 303 is carried out, through the use of at least the second additive in a second reduction catalyst device 332, which may comprise a second selective catalytic reduction catalyst $SCR_2$, and in some configurations a second slip-catalyst $SC_2$, arranged downstream of the second dosage device 371. The second slip-catalyst here oxidizes a surplus of ammonia, and/or provides an additional reduction of nitrogen oxides $NO_x$ in the exhaust stream 303. It should be noted that the reduction of nitrogen oxides $NO_x$ with the second reduction catalyst device 332 in this document may comprise partial oxidation, as long as the total reaction constitutes a reduction of nitrogen oxides $NO_x$.

It may be noted that a first temperature T1, which the first reduction catalyst device 331 is exposed to, and a second temperature T2, which the second reduction catalyst device 332 is exposed to, is very significant to the function of the exhaust treatment system 350. However, it is difficult to control these temperatures T1, T2, since they to a great extent depend on how the driver drives the vehicle, that is to say that the first T1 and second T2 temperatures depend on the current operation of the vehicle, and inputs via, for example, the accelerator pedal in the vehicle.

The method for exhaust treatment, and the exhaust treatment system 350 itself, become considerably more efficient than a traditional system (as shown in FIG. 2) by way of the first temperature T1 for the first reduction catalyst device 331 reaching, at for example starting processes, higher values for the first temperature T1 faster, and therefore achieving a higher efficiency at the reduction of nitrogen oxides $NO_x$, through the method according to the present invention. Accordingly, a more efficient reduction of nitrogen oxides $NO_x$ is obtained, for example at cold starts and throttle from low exhaust temperatures, resulting in a smaller increase of fuel consumption in such driving modes. In other words, the present invention utilizes the first T1 and second T2 temperatures, which are difficult to control, to its advantage, so that they contribute to increasing the overall efficiency of the exhaust purification system.

The above mentioned advantages for the exhaust treatment system 350 are also obtained for the method according to the present invention.

As mentioned above, according to one embodiment of the present invention, the slip-catalyst $SC_1$, $SC_2$ may be a multifunctional slip-catalyst, which both reduces nitrogen oxides $NO_x$, and oxidizes residues of additive, for example by way of primarily reducing nitrogen oxides $NO_x$, and secondarily oxidizing residues of additive. In order to obtain these characteristics, the slip-catalyst may, according to one embodiment, comprise one or several substances comprised in platinum metals, and/or one or several other substances that provide the slip-catalyst with similar characteristics as for the platinum metal group.

Such a multifunctional slip-catalyst $SC_1$, comprised in the first reduction catalyst device 331, may according to one embodiment of the invention constitute the first reduction catalyst device 331 on its own, meaning that the first reduction catalyst device 331 consists only of the multifunctional slip-catalyst $SC_1$.

Such a multifunctional slip-catalyst $SC_1$, $SC_{1b}$, comprised in the first reduction catalyst device 331, may, according to another embodiment of the invention, constitute the first reduction catalyst device 331 in combination with a first reduction catalyst $SCR_1$, meaning that the first reduction catalyst device 331 consists of the first reduction catalyst $SCR_1$, and the multifunctional slip-catalyst $SC_1$, and according to some embodiments also of an additional first slip-catalyst $SC_{1b}$.

Such a multifunctional slip-catalyst $SC_1$, $SC_{1b}$, comprised in the first reduction catalyst device 331, may, according to one embodiment of a method according to the invention, be used in a novel way in relation to prior art uses of slip-catalysts.

This new method for use of the multifunction slip-catalyst $SC_1$, $SC_{1b}$ uses the fact that the exhaust stream 303, when it passes through the first slip-catalyst $SC_1$, and/or the additional first slip-catalyst $SC_{1b}$, placed in the first reduction catalyst device 331, is rich in nitrogen oxides $NO_x$, that is to say, it contains a relatively large fraction of nitrogen oxides $NO_x$, meaning that the exhaust stream contains a surplus of $NO_x$-content in relation to the $NH_3$-content. This relatively large fraction of nitrogen oxides $NO_x$, that is to say the surplus of $NO_x$ in relation to $NH_3$, at the first reduction catalyst device 331 by far exceeds the fraction of nitrogen oxides $NO_x$, that is to say the surplus of $NO_x$ in relation to $NH_3$ in the exhaust stream 303 when this passes the second reduction catalyst device 332, which means that the first slip-catalyst $SC_1$, and/or the additional first slip-catalyst $SC_{1b}$, in the first reduction catalyst device 331 has a totally different impact on the exhaust stream 303 compared to a second slip-catalyst $SC_2$ in the second reduction catalyst device 332. This is due to the fact that the exhaust stream 303 contains much less of a surplus of nitrogen oxides $NO_x$, that is to say a much smaller surplus of $NO_x$ in relation to $NH_3$, at the second reduction catalyst device 332, than at the first reduction catalyst device 331.

When the first slip-catalyst $SC_1$, and/or the additional first slip-catalyst $SC_{1b}$, in the first reduction catalyst device 331 has good access to nitrogen oxides $NO_x$, that is to say when it has a relatively large surplus of $NO_x$ in relation to $NH_3$, it may thus be used as a multifunctional slip-catalyst both for reduction of nitrogen oxides $NO_x$ and for oxidation of additive, such as for example residues of additive having passed through a first reduction catalyst $SCR_1$.

For the second slip-catalyst $SC_2$ in the second reduction catalyst device 332, substantially only oxidation of residues of additive having passed through the second reduction catalyst $SCR_2$ is obtained, since only low levels of nitrogen oxides $NO_x$ are available in the exhaust stream 303.

Figure 7:
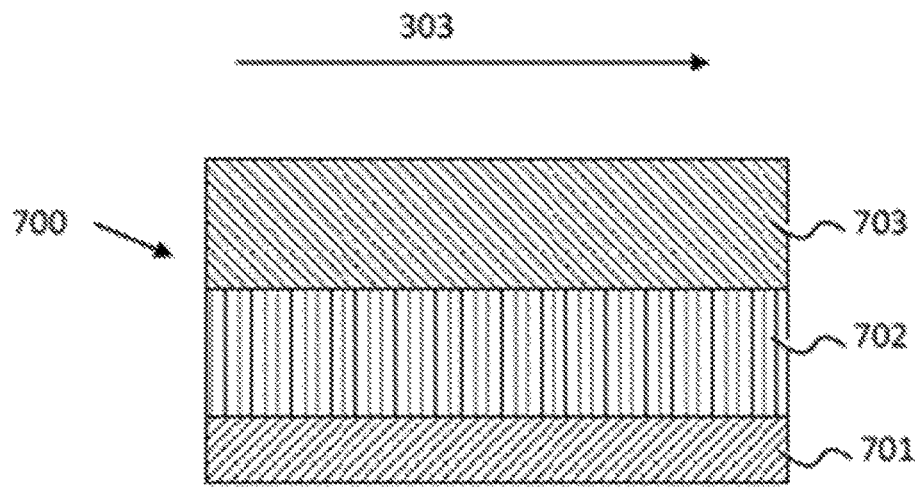

The multifunctional first slip-catalyst $SC_1$, and/or the additional first slip-catalyst $SC_{1b}$, 700, according to one embodiment comprises at least two active layers/strata arranged on at least one stabilizing layer/stratum 701, which is schematically illustrated in FIG. 7. It should be noted that the embodiment shown in FIG. 7 only is an example of a possible design of a multifunctional first slip-catalyst $SC_1$, and/or an additional first slip-catalyst $SC_{1b}$. A multifunctional first slip-catalyst $SC_1$, and/or an additional first slip-catalyst $SC_{1b}$, may be adapted in a number of other ways, as long as the above described reactions, which may for example correspond to equations 1 and 2, are achieved by the multifunctional first slip-catalyst $SC_1$, and/or the additional first slip-catalyst $SC_{1b}$. Accordingly, a number of designs, apart from the one shown in FIG. 7, of the multifunctional first slip-catalyst $SC_1$, and/or the additional first slip-catalyst $SC_{1b}$, which result in an oxidation of additive and a reduction of nitrogen oxides $NO_x$, may be used for the multifunctional first slip-catalyst $SC_1$, and/or the additional first slip-catalyst $SC_{1b}$.

The first layer 702 of these active layers comprises one or several substances, comprised in the platinum metals, or one or several other substances, which provide the slip-catalyst with similar characteristics as does the platinum metal group, that is to say, for example, oxidation of ammonia. The second layer 703 may comprise an $NO_x$-reducing coating, for example comprising Cu- or Fe-Zeolite, or vanadium. Zeolite is here activated with an active metal, such as for example copper (Cu) or iron (Fe). The second layer 703 is here in direct contact with the exhaust stream 303 that passes through the exhaust treatment system.

The multifunctional first slip-catalyst $SC_1$, and/or the additional first slip-catalyst $SC_{1b}$, according to one embodiment of the present invention, are of a relatively small size, so that a space velocity of over approximately 50,000 per hour may be obtained for a majority of driving modes. The use of the size-limited first slip-catalyst $SC_1$, and/or the additional first slip-catalyst $SC_{1b}$, in the first reduction catalyst device 331, wherein there is good access to nitrogen oxides $NO_x$ in relation to the access to ammonia, but wherein there are limitations in relation to the volume/size of the slip-catalyst $SC_1$, $SC_{1b}$, results in several surprising advantages.

First, the first slip-catalyst $SC_1$, and/or the additional first slip-catalyst $SC_{1b}$, may thus be used here as a multifunctional slip-catalyst, both for reduction of nitrogen oxides $NO_x$ and for oxidation of additive. The excellent availability of nitrogen oxides $NO_x$ at the first slip-catalyst $SC_1$, and/or at the additional first slip-catalyst $SC_{1b}$, results in a very efficient, good reduction of nitrogen oxides $NO_x$ with the first slip-catalyst $SC_1$, and/or at the additional first slip-catalyst $SC_{1b}$.

Additionally, tests have shown that the brief dwell-time of the exhaust stream 303 at the first slip-catalyst $SC_1$, and/or at the additional first slip-catalyst $SC_{1b}$, which is due to the fact that, because of its relatively limited size, the exhaust stream flows past the first slip-catalyst $SC_1$, and/or the additional first slip-catalyst $SC_{1b}$, quickly, in combination with the very good availability of nitrogen oxides $NO_x$, results in a very selective multifunctional slip-catalyst $SC_1$, $SC_{1b}$. It has been shown that the first slip-catalyst $SC_1$, and/or the additional first slip-catalyst $SC_{1b}$, are used surprisingly intensely under these conditions, that is to say at a brief dwell-time and with a high fraction of nitrogen oxides $NO_x$, which results in a very good reduction of nitrogen oxides $NO_x$.

In other words, the ability of the first slip-catalyst $SC_1$, and/or the additional first slip-catalyst $SC_{1b}$, to contribute with a reduction of the nitrogen oxides $NO_x$, and/or with oxidation of for example hydrocarbons and/or ammonia $NH_3$, may be impacted through selection of a suitable size for the first slip-catalyst $SC_1$ and/or the additional first slip-catalyst $SC_{1b}$, and/or by adding a suitable exhaust composition, for example containing suitable fractions of $NO_x$ and/or $NH_3$.

According to one embodiment of the present invention, the first reduction catalyst device 331, that is to say the first slip-catalyst $SC_1$, the first reduction catalyst $SCR_1$, and/or the additional first slip-catalyst $SC_{1b}$, may be used for oxidation of hydrocarbons HC and/or carbon monoxide CO, which occur naturally in the exhaust stream. For example, hydrocarbons HC in the exhaust stream 303 may be comprised in fuel residues from the combustion in the combustion engine 101, and/or from extra injections of fuel in connection with regeneration of the particulate filter cDPF.

The oxidation of hydrocarbons HC in the first reduction catalyst device 331 may also comprise at least one exothermal reaction, that is to say a reaction which generates heat, so that a temperature increase ensues for the first reduction catalyst device 331, and/or for components following downstream, such as the particulate filter cDPF 320 and/or a silencer, in the exhaust treatment system 350. Such temperature increase may be used at soot oxidation in the particulate filter cDPF 320, and/or to clean the silencer of by-products, such as for example urea. Through this at least one exothermal reaction, oxidation of hydrocarbons HC is also facilitated in the first reduction catalyst device 331. Additionally, the SCR-layer in the first slip-catalyst $SC_1$, and/or the additional first slip-catalyst $SC_{1b}$, may be deactivated over time by for example sulphur, which means that a heat generating exothermal reaction may be needed in order to secure the function of the first slip-catalyst $SC_1$, and/or the additional first slip-catalyst $SC_{1b}$, through a regeneration. Similarly, a heat generating exothermal reaction may be used in order to secure, through a regeneration, the function of a first selective reduction catalyst $SCR_1$. As mentioned above, the regeneration reduces the amount of sulphur in the catalyst/component which is regenerated.

The first multifunctional slip-catalyst $SC_1$, and/or the additional first slip-catalyst $SC_{1b}$, placed in the first reduction catalyst device 331, also has an ability to oxidize nitrogen monoxide NO into nitrogen dioxide $NO_2$. Thus, nitrogen dioxide $NO_2$ is supplied to the particulate filter cDPF placed downstream, which facilitates an efficient soot oxidation in the particulate filter cDPF, where soot oxidation is a nitrogen dioxide based oxidation.

Availability of nitrogen dioxide $NO_2$ downstream of the first multifunctional slip-catalyst $SC_1$, and/or the additional first slip-catalyst $SC_{1b}$, also means that an increased reduction of nitrogen oxides $NO_x$ over the second reduction catalyst device 332 may be obtained.

According to one embodiment of the present invention, the first multifunctional slip-catalyst $SC_1$, and/or the multifunctional additional first slip-catalyst $SC_{1b}$, comprises one or several suitable substances, such as the above mentioned platinum metals, which create the at least one exothermal reaction, which results in the temperature increase when the one or several suitable substances react with the exhaust stream 303. At the reactions, nitrogen monoxide NO is oxidized into nitrogen dioxide $NO_2$. At the reactions, carbon monoxide NO, and/or hydrocarbons HC, are oxidized as described above.

The characteristics listed above and the advantages specified for a first multifunctional slip-catalyst $SC_1$, and/or the additional first slip-catalyst $SC_{1b}$ in the first reduction catalyst device 331, may be made to function very well for an exhaust treatment system 350 as described above, that is to say with a first reduction catalyst device 331, followed downstream by a particulate filter, partly coated with a catalytic coating cDPF 320, followed downstream by a second reduction catalyst device 332, and without any oxidation catalyst DOC between the first reduction catalyst device 331 and the filter cDPF 320.

According to one embodiment of the method according to the present invention, the reduction is controlled with the first reduction catalyst device 331, so that it occurs within a reduction temperature interval $T_{red}$, which at least partly differs from an oxidation temperature interval $T_{ox}$, within which a significant soot oxidation in the particulate filter 320 occurs, $T_{red} \neq T_{ox}$, so that the reduction of nitrogen oxides $NO_x$ in the first reduction catalyst device does not compete significantly with the nitrogen dioxide based soot oxidation in the particulate filter cDPF.

According to one embodiment of the method according to the present invention, the supply of additive to the first dosage device 371, and/or the second dosage device 372, is increased to a level of supplied additive at which residues/precipitates/crystallisation may arise. This level may for example be determined by way of a comparison with a predetermined threshold value for the supply. The use of this embodiment may thus result in residues/precipitates/crystals of additive being created.

According to one embodiment of the method according to the present invention, the supply of additive to the first dosage device 371, and/or the second dosage device 372, is reduced when precipitates/residues of additive have formed, so that these precipitates may be heated away. The reduction may entail that the supply is cut completely. Accordingly, for example a larger dosage amount in the first dosage position for the first reduction catalyst device may be allowed, since potential precipitates/residues may be heated away naturally, at the same time as the emission requirements are met by the second reduction catalyst device during this time. The reduction/interruption of supply may here depend on currently measured and/or predicted operating conditions for the combustion engine, and/or the exhaust treatment system. Thus, for example, the second reduction catalyst device 332 does not have to be set up to cope with an interruption of the supply through the first dosage device 371 for all operating modes. An intelligent control therefore facilitates a smaller system, which may be used when suitable, and when this system may provide a required catalytic function.

According to one embodiment of the method, the first reduction catalyst device 371 is optimized based on characteristics, such as catalytic characteristics, for the first 371, and/or the second 372 reduction catalyst device. Additionally, the second reduction catalyst device 372 may be optimized based on characteristics, such as catalytic characteristics, for the first 371, and/or the second 372 reduction catalyst device. These possibilities of optimizing the first reduction catalyst device, and/or the second reduction catalyst device, result in an overall efficient exhaust purification, which better reflects the conditions of the complete exhaust treatment system.

The above mentioned characteristics for the first 371, and/or second 372 reduction catalyst device, may be related to one or several catalytic characteristics for the first 371 and/or the second 372 reduction catalyst device, a catalyst type for the first 371 and/or the second 372 reduction catalyst device, a temperature interval, within which the first 371 and/or the second 372 reduction catalyst device is active, and a coverage of ammonia for the first 371 and/or the second 372 reduction catalyst device 372.

According to one embodiment of the present invention, the first reduction catalyst device 371 and the second reduction catalyst device 372, respectively, are optimized based on operating conditions for the first 371 and the second 372 reduction catalyst device, respectively. These operating conditions may be related to a temperature, that is to say a static temperature, for the first 371 and the second 372 reduction catalyst device, respectively, and/or to a temperature trend, that is to say to a change of the temperature, for the first 371 and the second 372 reduction catalyst device, respectively.

According to one embodiment of the method according to the present invention, an active control is implemented of the reduction carried out by the first reduction catalyst device 331, based on a relationship between the amount of nitrogen dioxide $NO_{2\_2}$ and the amount of nitrogen oxides $NO_{x\_2}$ reaching the second reduction catalyst device 332. In other words, the ratio $NO_{2\_2}/NO_{x\_2}$ is controlled, so that it has a suitable value for the reduction in the second reduction catalyst device 332, through which a more efficient reduction may be obtained. In further detail, herein the first reduction catalyst device 331 has a first reduction of a first amount of nitrogen oxides $NO_{x\_1}$ reaching the first reduction catalyst device 331. At the second reduction catalyst device 332, a second reduction of a second amount of nitrogen oxides $NO_{x\_2}$ reaching the second reduction catalyst device 332, is carried out, wherein an adaptation is carried out of the ratio $NO_{2\_2}/NO_{x\_2}$, between the amount of nitrogen dioxide $NO_{2\_2}$ and the second amount of nitrogen oxides $NO_{x\_2}$ reaching the second reduction catalyst device 332. This adaptation is carried out herein with the use of an active control of the first reduction, based on a value for the ratio $NO_{2\_2}/NO_{x\_2}$ with the intention of providing the ratio $NO_{2\_2}/NO_{x\_2}$ with a value making the second reduction more efficient. The value for the ratio $NO_{2\_2}/NO_{x\_2}$ may herein consist of a measured value, a modelled value and/or a predicted value.

A person skilled in the art will realize that a method for treatment of an exhaust stream according to the present invention may also be implemented in a computer program, which when executed in a computer will cause the computer to execute the method. The computer program usually forms a part of a computer program product 503, wherein the computer program product comprises a suitable digital non-volatile/permanent/persistent/durable storage medium on which the computer program is stored. Said non-volatile/permanent/persistent/durable computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 5:
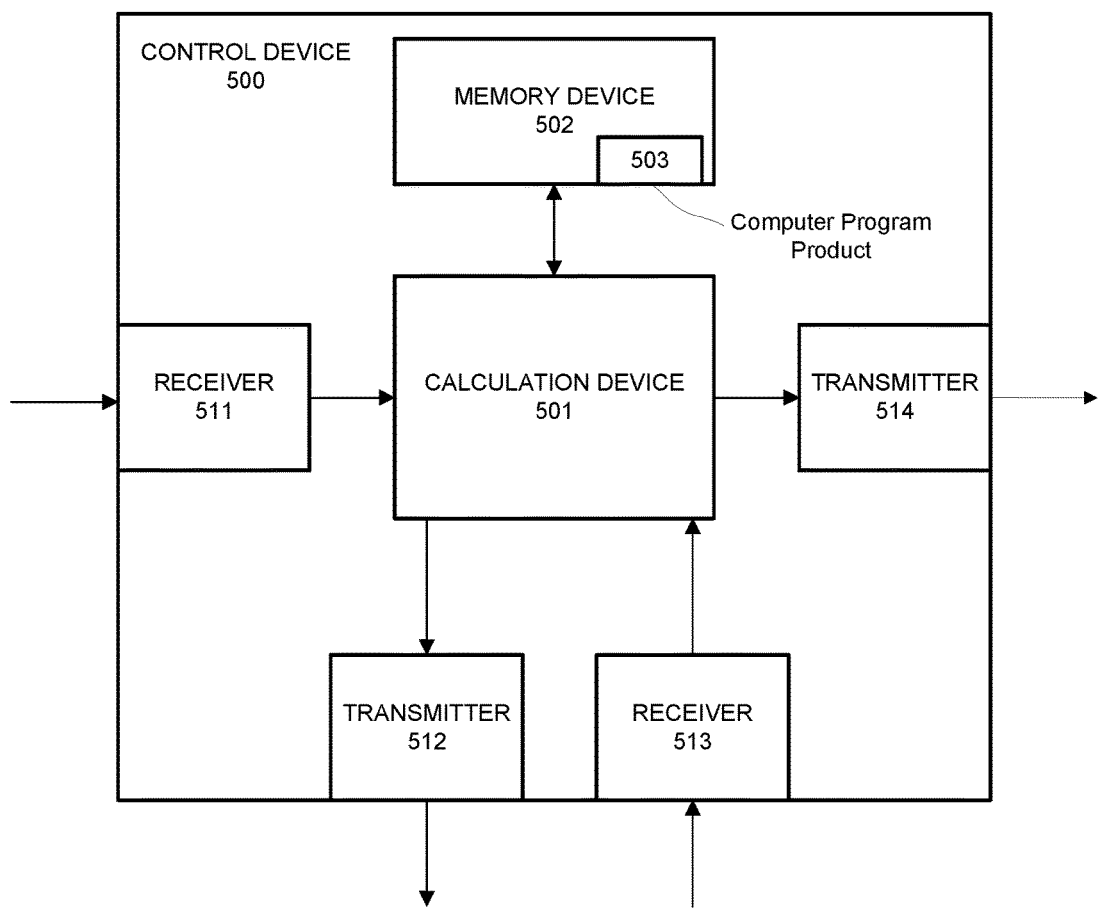
FIG. 5 shows a control device according to the present invention.
Figure 6:
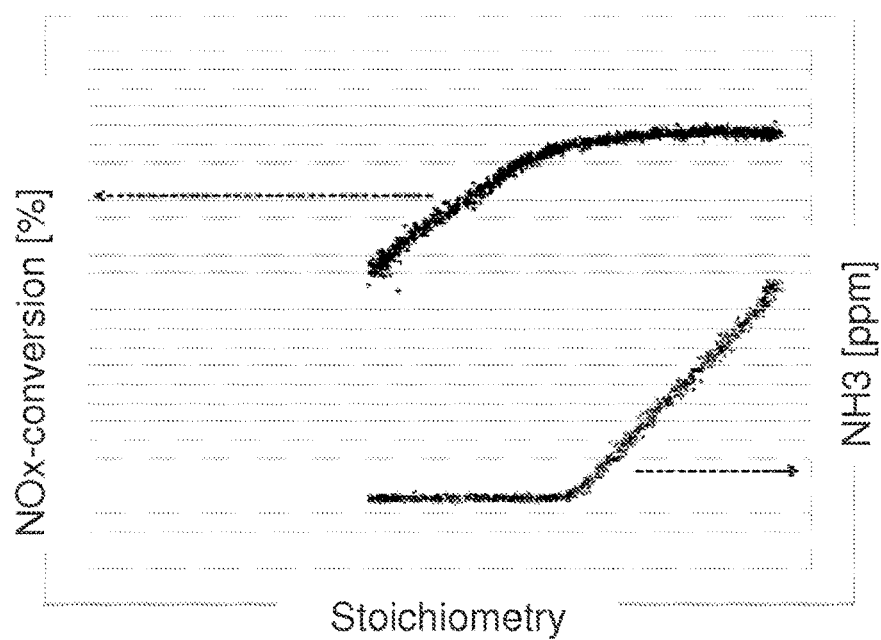
FIG. 6 shows among others a ratio between $NO_x$-conversion and $NH_3$-slip, and FIG. 7 schematically shows a multifunctional slip-catalyst.

FIG. 5 schematically shows a control device 500. The control device 500 comprises a calculation unit 501, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation unit 501 is connected to a memory unit 502, installed in the control device 500, providing the calculation device 501 with e.g. the stored program code and/or the stored data, which the calculation device 501 needs in order to be able to carry out calculations. The calculation unit 501 is also set up to store interim or final results of calculations in the memory unit 502.

Further, the control device 500 is equipped with devices 511, 512, 513, 514 for receiving and sending of input and output signals, respectively. These input and output signals may contain wave shapes, pulses, or other attributes, which may be detected as information by the devices 511, 513 for the receipt of input signals, and may be converted into signals that may be processed by the calculation unit 501. These signals are then provided to the calculation unit 501. The devices 512, 514 for sending output signals are arranged to convert the calculation result from the calculation unit 501 into output signals for transfer to other parts of the vehicle's control system, and/or the component(s) for which the signals are intended.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation unit 501, and that the above-mentioned memory may consist of the memory unit 502.

Generally, control systems in modern vehicles consist of a communications bus system, consisting of one or several communications buses to connect a number of electronic control devices (ECUs), or controllers, and different components localised on the vehicle. Such a control system may comprise a large number of control devices, and the responsibility for a specific function may be distributed among more than one control device. Vehicles of the type shown thus often comprise significantly more control devices than what is shown in FIG. 5, which is well known to a person skilled in the art within the technology area.

As a person skilled in the art will realize, the control device 500 in FIG. 5 may comprise one or several of the control devices 115 and 160 in FIG. 1, the control device 260 in FIG. 2, the control device 360 in FIG. 3 and the control device 374 in FIG. 3.

The present invention, in the embodiment shown, is implemented in the control device 500. The invention may, however, also be implemented wholly or partly in one or several other control devices, already existing in the vehicle, or in a control device dedicated to the present invention.

A person skilled in the art will also realize that the above exhaust treatment system may be modified according to the different embodiments of the method according to the invention. In addition, the invention relates to the motor vehicle 100, for example a car, a truck or a bus, or another unit comprising at least one exhaust treatment system according to the invention, such as for example a vessel or a voltage/current-generator.

The present invention is not limited to the embodiments of the invention described above, but relates to and comprises all embodiments within the scope of the enclosed independent claims.

The invention claimed is:

1. An exhaust treatment system, arranged for treatment of an exhaust stream, which results from a combustion in a combustion engine, said system comprising:
   a first dosage device, arranged to supply a first additive into said exhaust stream;
   a first reduction catalyst device, arranged downstream of said first dosage device, and arranged for reduction of nitrogen oxides $NO_x$ in said exhaust stream through the use of said first additive;
   a particulate filter, at least partly comprising a catalytically oxidizing coating arranged to catch and oxidize soot particles, and to oxidize one or several of nitrogen oxide NO and incompletely oxidized carbon compounds in said exhaust stream, wherein said particulate filter is arranged downstream of said first reduction catalyst device and is the first exhaust treatment system component, which said exhaust stream reaches after having passed said first reduction catalyst device;
   a second dosage device, arranged downstream of said particulate filter, and arranged to supply a second additive into said exhaust stream; and
   a second reduction catalyst device, arranged downstream of said second dosage device, and arranged for reduction of nitrogen oxides $NO_x$ in said exhaust stream through the use of at least one of said first and said second additive.

2. An exhaust treatment system according to claim 1, wherein at least one of said first and second additives comprises ammonia, or a substance from which ammonia may be extracted and/or released.

3. An exhaust treatment system according to claim 1, wherein said first reduction catalyst device comprises one from among the group of:
   a first selective catalytic reduction catalyst ($SCR_1$);
   a first selective catalytic reduction catalyst ($SCR_1$), integrated downstream with a first slip-catalyst ($SC_1$), wherein said first slip-catalyst ($SC_1$) is arranged to oxidize a residue of additive, and/or to assist said first selective catalytic reduction catalyst ($SCR_1$) with an additional reduction of nitrogen oxides $NO_x$ in said exhaust stream;
   a first selective catalytic reduction catalyst ($SCR_1$), followed downstream by a separate first slip-catalyst ($SC_1$), wherein said first slip-catalyst ($SC_1$) is arranged to oxidize a residue of additive, and/or to assist said first selective catalytic reduction catalyst ($SCR_1$) with an additional reduction of nitrogen oxides $NO_x$ in said exhaust stream;
   a first slip-catalyst ($SC_1$), integrated downstream with a first selective catalytic reduction catalyst ($SCR_1$), wherein said first slip-catalyst ($SC_1$) is arranged to oxidize additive, and/or to assist said first selective catalytic reduction catalyst ($SCR_1$) with a reduction of nitrogen oxides $NO_x$ in said exhaust stream;
   a first slip-catalyst ($SC_1$), followed downstream by a separate first selective catalytic reduction catalyst ($SCR_1$), wherein said first slip-catalyst ($SC_1$) is arranged to oxidize additive, and/or to assist said first selective catalytic reduction catalyst ($SCR_1$) with a reduction of nitrogen oxides $NO_x$ in said exhaust stream;
   a first slip-catalyst ($SC_1$), integrated downstream with a first selective catalytic reduction catalyst ($SCR_1$), integrated downstream with an additional first slip-catalyst ($SC_{1b}$), wherein said first slip-catalyst ($SC_1$), and/or said additional first slip-catalyst ($SC_{1b}$), is arranged to oxidize additive, and/or to assist said first selective catalytic reduction catalyst ($SCR_1$) with a reduction of nitrogen oxides $NO_x$ in said exhaust stream;
   a first slip-catalyst ($SC_1$), followed downstream by a separate first selective catalytic reduction catalyst ($SCR_1$), followed downstream by a separate additional first slip-catalyst ($SC_{1b}$), wherein said first slip-catalyst ($SC_1$), and/or said additional first slip-catalyst ($SC_{1b}$), is arranged to oxidize additive, and/or to assist said first selective catalytic reduction catalyst ($SCR_1$) with a reduction of nitrogen oxides $NO_x$ in said exhaust stream;
   a first slip-catalyst ($SC_1$), integrated downstream with a first selective catalytic reduction catalyst ($SCR_1$), followed downstream by a separate additional first slip-catalyst ($SC_{1b}$), wherein the first slip-catalyst ($SC_1$), and/or the additional first slip-catalyst ($SC_{1b}$), is arranged primarily to reduce nitrogen oxides $NO_x$, and secondarily to oxidize additive in the exhaust stream;
   a first slip-catalyst ($SC_1$), followed downstream by a separate first selective catalytic reduction catalyst ($SCR_1$), integrated downstream with a separate additional first slip-catalyst ($SC_{1b}$), wherein the first slip-catalyst ($SC_1$), and/or the additional first slip-catalyst ($SC_{1b}$), is arranged primarily to reduce nitrogen oxides ($NO_x$), and secondarily to oxidize additive in the exhaust stream;

a first slip-catalyst ($SC_1$), which is arranged primarily to reduce nitrogen oxides $NO_x$, and secondarily to oxidize additive in said exhaust stream;

a first selective catalytic reduction catalyst ($SCR_1$) combined with a purely oxidizing coating in its outlet part;

a first slip-catalyst ($SC_1$), integrated downstream with a first selective catalytic reduction catalyst ($SCR_1$) combined with a purely oxidizing coating in its outlet part, wherein said first slip-catalyst ($SC_1$) is arranged primarily to reduce nitrogen oxides $NO_x$, and secondarily to oxidize additive in said exhaust stream; and a first slip-catalyst ($SC_1$), followed downstream by a separate first selective catalytic reduction catalyst ($SCR_1$) combined with a purely oxidizing coating in its outlet part, wherein said first slip-catalyst ($SC_1$) is arranged primarily to reduce nitrogen oxides $NO_x$, and secondarily to oxidize additive in said exhaust stream.

4. An exhaust treatment system according to claim 1, wherein said second reduction catalyst device comprises one from among the group of:

a second selective catalytic reduction catalyst ($SCR_2$);

a second selective catalytic reduction catalyst ($SCR_2$), integrated downstream with a second slip-catalyst ($SC_2$), wherein said second slip-catalyst ($SC_2$) is arranged to oxidize a residue of additive, and/or to assist said second selective catalytic reduction catalyst ($SCR_2$) with an additional reduction of nitrogen oxides $NO_x$ in said exhaust stream; and a second selective catalytic reduction catalyst ($SCR_2$), followed downstream by a separate second slip-catalyst ($SC_2$), wherein said second slip-catalyst ($SC_2$) is arranged to oxidize a residue of additive, and/or to assist said second selective catalytic reduction catalyst ($SCR_2$) with an additional reduction of nitrogen oxides $NO_x$ in said exhaust stream.

5. An exhaust treatment system according to claim 1, wherein said exhaust treatment system comprises a system for supply of additive, which comprises at least one pump, arranged to supply said first and second dosage device with said first and second, additive, respectively.

6. An exhaust treatment system according to claim 5, wherein said system for supply of additive comprises a dosage control device, arranged to control said at least one pump.

7. An exhaust treatment system according to claim 5, wherein said system for supply of additive comprises a dosage control device, comprising:

a first pump control device, arranged to control said at least one pump, wherein a first dosage of said first additive is supplied to said exhaust stream through the use of said first dosage device; and a second pump control device, arranged to control said at least one pump, wherein a second dosage of said second additive is supplied to said exhaust stream through the use of said second dosage device.

8. An exhaust treatment system according to claim 1, wherein said first reduction catalyst device is arranged for the reduction of said nitrogen oxides $NO_x$ within a reduction temperature interval $T_{red}$, which at least partly differs from an oxidation temperature interval $T_{ox}$, within which said particulate filter is arranged for oxidation of incompletely oxidized carbon compounds; $T_{red} \neq T_{ox}$.

9. An exhaust treatment system according to claim 1, wherein said first reduction catalyst device constitutes an, at least partly, protective substrate, upstream of a catalytically oxidizing coating.

10. A method for treatment of an exhaust stream, which results from a combustion in a combustion engine, said method comprising:

controlling a supply of a first additive into said exhaust stream through the use of a first dosage device, wherein said supply of said first additive impacts a reduction of nitrogen oxides $NO_x$ in said exhaust stream, through the use of said first additive in at least one first reduction catalyst device, arranged downstream of said first dosage device;

catching and oxidizing of soot particles, and oxidizing of one or several of nitrogen oxide NO and incompletely oxidized carbon compounds in said exhaust stream, through the use of a particulate filter, at least partly comprising a catalytically oxidizing coating, which is arranged downstream of said first reduction catalyst device and is the first exhaust treatment system component, which said exhaust stream reaches after having passed said first reduction catalyst device; and controlling supply of a second additive into said exhaust stream through the use of a second dosage device, arranged downstream of said particulate filter, wherein said supply of said second additive impacts a reduction of nitrogen oxides $NO_x$ in said exhaust stream, through the use of at least one of said first and said second additive in a second reduction catalyst device, arranged downstream of said second dosage device.

11. A method according to claim 10, wherein said combustion engine is controlled to generate heat, for heating of said first reduction catalyst device to such an extent that said first reduction catalyst device reaches a predetermined temperature.

12. A method according to claim 10, wherein said reduction by way of said first reduction catalyst device is controlled to occur within a reduction temperature interval $T_{red}$, which at least partly differs from an oxidation temperature interval $T_{ox}$, within which said oxidation of incompletely oxidized carbon compounds, by way of said particulate filter, occurs; $T_{red} \neq T_{ox}$.

13. A method according to claim 10, wherein said supply of at least one of said first and second additives, through the use of one of said first dosage device and said second dosage device, respectively, is increased to a level at which there is a risk of precipitates of said additive arising.

14. A method according to claim 13, wherein said first reduction catalyst device comprises a first slip-catalyst ($SC_1$), which primarily carries out a reduction of nitrogen oxides $NO_x$, and secondarily carries out oxidation of a residue of additive in said exhaust stream.

15. A method according to claim 10, wherein said supply of at least one of said first and second additive, through the use of one of said first dosage device and said second dosage device, respectively, is reduced, following which residues of at least one of said first and second additives are eliminated by heat in said exhaust stream, wherein said reducing of said supply is carried out, if the required total catalytic function for an exhaust treatment system carrying out said method is provided after said reducing.

16. A method according to claim 15, wherein said required catalytic function depends on currently measured and/or predicted operating conditions for said combustion engine.

17. A method according to claim 15, wherein said reducing of said supply constitutes an interruption of said supply.

18. A method according to claim 10, wherein said impact on said reduction of nitrogen oxides $NO_x$ for said first reduction catalyst device is controlled, based on one or several characteristics and/or operating conditions for said first reduction catalyst device.

19. A method according to claim 18, wherein said characteristics for said first and second reduction catalyst devices, respectively, are related to one or several from among the group of:
catalytic characteristics for said first reduction catalyst device;
catalytic characteristics for said second reduction catalyst device;
a catalyst type for said first reduction catalyst device;
a catalyst type for said second reduction catalyst device;
a temperature interval within which said first reduction catalyst device is active;
a temperature interval within which said second reduction catalyst device is active;
an ammoniac coverage degree for said first reduction catalyst device; and
an ammoniac coverage degree for said second reduction catalyst device.

20. A method according to claim 10, wherein said impact on said reduction of nitrogen oxides $NO_x$ for said first reduction catalyst device is controlled, based on one or several characteristics and/or operating conditions for said second reduction catalyst device.

21. A method according to claim 10, wherein said impact on said second reduction catalyst device is controlled, based on one or several characteristics and/or operating conditions for said second reduction catalyst device.

22. A method according to claim 10, wherein said impact on said second reduction catalyst device is controlled, based on one or several characteristics and/or operating conditions for said first reduction catalyst device.

23. A method according to claim 10, wherein said first reduction catalyst device constitutes a substrate, which at least partly protects a catalytically oxidizing coating.

24. A method according to claim 10, wherein
said first reduction catalyst device carries out a first reduction of a first amount of said nitrogen oxides $NO_{x\_1}$ reaching said first reduction catalyst device;
said second reduction catalyst device carries out a second reduction of a second amount of said nitrogen oxides $NO_{x\_2}$ reaching said second reduction catalyst device; and
an adaptation is carried out of a ratio $NO_{2\_2}/NO_{x\_2}$, where $NO_{2\_2}$ is an amount of nitrogen dioxide in said exhaust stream reaching said second reduction catalyst device and $NO_{x\_2}$ is said second amount of said nitrogen oxides in said exhaust stream reaching said second reduction catalyst device, wherein an active control of said first reduction of said first amount of nitrogen oxides $NO_{x\_1}$ is carried out, based on a value for said ratio $NO_{2\_2}/NO_{x\_2}$.

25. A method according to claim 24, wherein said value for said ratio $NO_{2\_2}/NO_{x\_2}$ consists of one from among the group:
a measured value;
a modelled value; and
a predicted value.

26. A computer program product comprising computer program code stored on a non-transitory computer readable medium, said computer program product for treatment of an exhaust stream, which results from a combustion in a combustion engine, said computer program code comprising computer instructions to cause one or more computer processors to perform the operations of:
controlling a supply of a first additive into said exhaust stream through the use of a first dosage device, wherein said supply of said first additive impacts a reduction of nitrogen oxides $NO_x$ in said exhaust stream, through the use of said first additive in at least one first reduction catalyst device, arranged downstream of said first dosage device;
catching and oxidizing of soot particles, and oxidizing of one or several of nitrogen oxide NO and incompletely oxidized carbon compounds in said exhaust stream, through the use of a particulate filter, at least partly comprising a catalytically oxidizing coating, which is arranged downstream of said first reduction catalyst device and is the first exhaust treatment system component, which said exhaust stream reaches after having passed said first reduction catalyst device; and
controlling supply of a second additive into said exhaust stream through the use of a second dosage device, arranged downstream of said particulate filter, wherein said supply of said second additive impacts a reduction of nitrogen oxides $NO_x$ in said exhaust stream, through the use of at least one of said first and said second additive in a second reduction catalyst device, arranged downstream of said second dosage device.

27. An exhaust treatment system, arranged for treatment of an exhaust stream, which results from a combustion in a combustion engine, said system comprising:
a first dosage device, arranged to supply a first additive into said exhaust stream;
a first reduction catalyst device, arranged downstream of said first dosage device, and arranged for reduction of nitrogen oxides $NO_x$ in said exhaust stream through the use of said first additive, wherein said first reduction catalyst device constitutes an, at least partly, protective substrate, upstream of a catalytically oxidizing coating;
a particulate filter, at least partly comprising a catalytically oxidizing coating, which is arranged downstream of said first reduction catalyst device, and is arranged to catch and oxidize soot particles, and to oxidize one or several of nitrogen oxide NO and incompletely oxidized carbon compounds in said exhaust stream;
a second dosage device, arranged downstream of said particulate filter, and arranged to supply a second additive into said exhaust stream; and
a second reduction catalyst device, arranged downstream of said second dosage device, and arranged for reduction of nitrogen oxides $NO_x$ in said exhaust stream through the use of at least one of said first and said second additive.

28. A method for treatment of an exhaust stream, which results from a combustion in a combustion engine, said method comprising:
controlling a supply of a first additive into said exhaust stream through the use of a first dosage device, wherein said supply of said first additive impacts a reduction of nitrogen oxides $NO_x$ in said exhaust stream, through the use of said first additive in at least one first reduction catalyst device, arranged downstream of said first dosage device, wherein said first reduction catalyst device constitutes an, at least partly, protective substrate, upstream of a catalytically oxidizing coating;
catching and oxidizing of soot particles, and oxidizing of one or several of nitrogen oxide NO and incompletely oxidized carbon compounds in said exhaust stream, through the use of a particulate filter, at least partly comprising a catalytically oxidizing coating, which is arranged downstream of said first reduction catalyst device; and controlling supply of a second additive into said exhaust stream through the use of a second dosage device, arranged downstream of said particulate filter, wherein said supply of said second additive impacts a reduction of nitrogen oxides $NO_x$ in said exhaust stream, through the use of at least one of said first and said second additive in a second reduction catalyst device, arranged downstream of said second dosage device.

29. A method for treatment of an exhaust stream, which results from a combustion in a combustion engine, said method comprising:

controlling a supply of a first additive into said exhaust stream through the use of a first dosage device, wherein said supply of said first additive impacts a reduction of nitrogen oxides $NO_x$ in said exhaust stream, through the use of said first additive in at least one first reduction catalyst device, arranged downstream of said first dosage device;

catching and oxidizing of soot particles, and oxidizing of one or several of nitrogen oxide NO and incompletely oxidized carbon compounds in said exhaust stream, through the use of a particulate filter, at least partly comprising a catalytically oxidizing coating, which is arranged downstream of said first reduction catalyst device;

controlling said combustion engine to generate heat, for heating of said first reduction catalyst device to such an extent that said first reduction catalyst device reaches a predetermined temperature; and controlling supply of a second additive into said exhaust stream through the use of a second dosage device, arranged downstream of said particulate filter, wherein said supply of said second additive impacts a reduction of nitrogen oxides $NO_x$ in said exhaust stream, through the use of at least one of said first and said second additive in a second reduction catalyst device, arranged downstream of said second dosage device.

30. A computer program product comprising computer program code stored on a non-transitory computer readable medium, said computer program product for treatment of an exhaust stream, which results from a combustion in a combustion engine, said computer program code comprising computer instructions to cause one or more computer processors to perform the operations of:

controlling a supply of a first additive into said exhaust stream through the use of a first dosage device, wherein said supply of said first additive impacts a reduction of nitrogen oxides $NO_x$ in said exhaust stream, through the use of said first additive in at least one first reduction catalyst device, arranged downstream of said first dosage device;

catching and oxidizing of soot particles, and oxidizing of one or several of nitrogen oxide NO and incompletely oxidized carbon compounds in said exhaust stream, through the use of a particulate filter, at least partly comprising a catalytically oxidizing coating, which is arranged downstream of said first reduction catalyst device;

controlling said combustion engine to generate heat, for heating of said first reduction catalyst device to such an extent that said first reduction catalyst device reaches a predetermined temperature; and controlling supply of a second additive into said exhaust stream through the use of a second dosage device, arranged downstream of said particulate filter, wherein said supply of said second additive impacts a reduction of nitrogen oxides $NO_x$ in said exhaust stream, through the use of at least one of said first and said second additive in a second reduction catalyst device, arranged downstream of said second dosage device.

31. An exhaust treatment system, arranged for treatment of an exhaust stream, which results from a combustion in a combustion engine, said system comprising:

a first dosage device, arranged to supply a first additive into said exhaust stream;

a first reduction catalyst device, arranged downstream of said first dosage device, wherein said first reduction catalyst device comprises a first slip-catalyst ($SC_1$), which primarily carries out a reduction of nitrogen oxides $NO_x$, and secondarily carries out oxidation of a residue of additive in said exhaust stream;

a particulate filter, at least partly comprising a catalytically oxidizing coating, which is arranged downstream of said first reduction catalyst device, and is arranged to catch and oxidize soot particles, and to oxidize one or several of nitrogen oxide NO and incompletely oxidized carbon compounds in said exhaust stream;

a second dosage device, arranged downstream of said particulate filter, and arranged to supply a second additive into said exhaust stream; and a second reduction catalyst device, arranged downstream of said second dosage device, and arranged for reduction of nitrogen oxides $NO_x$ in said exhaust stream through the use of at least one of said first and said second additive.

32. A method for treatment of an exhaust stream, which results from a combustion in a combustion engine, said method comprising:

controlling a supply of a first additive into said exhaust stream through the use of a first dosage device, wherein said supply of said first additive impacts a reduction of nitrogen oxides $NO_x$ in said exhaust stream, through the use of said first additive in at least one first reduction catalyst device, arranged downstream of said first dosage device, wherein said first reduction catalyst device comprises a first slip-catalyst ($SC_1$), which primarily carries out a reduction of nitrogen oxides $NO_x$, and secondarily carries out oxidation of a residue of additive in said exhaust stream;

catching and oxidizing of soot particles, and oxidizing of one or several of nitrogen oxide NO and incompletely oxidized carbon compounds in said exhaust stream, through the use of a particulate filter, at least partly comprising a catalytically oxidizing coating, which is arranged downstream of said first reduction catalyst device; and controlling supply of a second additive into said exhaust stream through the use of a second dosage device, arranged downstream of said particulate filter, wherein said supply of said second additive impacts a reduction of nitrogen oxides $NO_x$ in said exhaust stream, through the use of at least one of said first and said second additive in a second reduction catalyst device, arranged downstream of said second dosage device.

33. A method for treatment of an exhaust stream, which results from a combustion in a combustion engine, said method comprising:

controlling a supply of a first additive into said exhaust stream through the use of a first dosage device, wherein said supply of said first additive impacts a reduction of nitrogen oxides $NO_x$ in said exhaust stream, through the use of said first additive in at least one first reduction catalyst device, arranged downstream of said first dosage device;

catching and oxidizing of soot particles, and oxidizing of one or several of nitrogen oxide NO and incompletely oxidized carbon compounds in said exhaust stream, through the use of a particulate filter, at least partly comprising a catalytically oxidizing coating, which is arranged downstream of said first reduction catalyst device;

controlling supply of a second additive into said exhaust stream through the use of a second dosage device, arranged downstream of said particulate filter, wherein said supply of said second additive impacts a reduction of nitrogen oxides $NO_x$ in said exhaust stream, through the use of at least one of said first and said second additive in a second reduction catalyst device, arranged downstream of said second dosage device; and reducing said supply of at least one of said first and second additive, through the use of one of said first dosage device and said second dosage device, respectively, following which residues of at least one of said first and second additives are eliminated by heat in said exhaust stream, wherein said reducing of said supply is carried out, if the required total catalytic function for an exhaust treatment system carrying out said method is provided after said reducing.

34. A computer program product comprising computer program code stored on a non-transitory computer readable medium, said computer program product for treatment of an exhaust stream, which results from a combustion in a combustion engine, said computer program code comprising computer instructions to cause one or more computer processors to perform the operations of:

controlling a supply of a first additive into said exhaust stream through the use of a first dosage device, wherein said supply of said first additive impacts a reduction of nitrogen oxides $NO_x$ in said exhaust stream, through the use of said first additive in at least one first reduction catalyst device, arranged downstream of said first dosage device;

catching and oxidizing of soot particles, and oxidizing of one or several of nitrogen oxide NO and incompletely oxidized carbon compounds in said exhaust stream, through the use of a particulate filter, at least partly comprising a catalytically oxidizing coating, which is arranged downstream of said first reduction catalyst device;

controlling supply of a second additive into said exhaust stream through the use of a second dosage device, arranged downstream of said particulate filter, wherein said supply of said second additive impacts a reduction of nitrogen oxides $NO_x$ in said exhaust stream, through the use of at least one of said first and said second additive in a second reduction catalyst device, arranged downstream of said second dosage device; and reducing said supply of at least one of said first and second additive, through the use of one of said first dosage device and said second dosage device, respectively, following which residues of at least one of said first and second additives are eliminated by heat in said exhaust stream, wherein said reducing of said supply is carried out, if the required total catalytic function for an exhaust treatment system carrying out said method is provided after said reducing.

35. A method for treatment of an exhaust stream, which results from a combustion in a combustion engine, said method comprising:

controlling a supply of a first additive into said exhaust stream through the use of a first dosage device, wherein said supply of said first additive impacts a reduction of nitrogen oxides $NO_x$ in said exhaust stream, through the use of said first additive in at least one first reduction catalyst device, arranged downstream of said first dosage device, wherein said first reduction catalyst device carries out a first reduction of a first amount of said nitrogen oxides $NO_{x\_1}$ reaching said first reduction catalyst device;

catching and oxidizing of soot particles, and oxidizing of one or several of nitrogen oxide NO and incompletely oxidized carbon compounds in said exhaust stream, through the use of a particulate filter, at least partly comprising a catalytically oxidizing coating, which is arranged downstream of said first reduction catalyst device; and controlling supply of a second additive into said exhaust stream through the use of a second dosage device, arranged downstream of said particulate filter, wherein said supply of said second additive impacts a reduction of nitrogen oxides $NO_x$ in said exhaust stream, through the use of at least one of said first and said second additive in a second reduction catalyst device, arranged downstream of said second dosage device, wherein said second reduction catalyst device carries out a second reduction of a second amount of said nitrogen oxides $NO_{x\_2}$ reaching said second reduction catalyst device, wherein an adaptation is carried out of a ratio $NO_{2\_2}/NO_{x\_2}$, where $NO_{2\_2}$ is an amount of nitrogen dioxide in said exhaust stream reaching said second reduction catalyst device and $NO_{x\_2}$ is said second amount of said nitrogen oxides in said exhaust stream reaching said second reduction catalyst device, wherein an active control of said first reduction of said first amount of nitrogen oxides $NO_{x\_1}$ is carried out, based on a value for said ratio $NO_{2\_2}/NO_{x\_2}$.

36. A computer program product comprising computer program code stored on a non-transitory computer readable medium, said computer program product for treatment of an exhaust stream, which results from a combustion in a combustion engine, said computer program code comprising computer instructions to cause one or more computer processors to perform the operations of:

controlling a supply of a first additive into said exhaust stream through the use of a first dosage device, wherein said supply of said first additive impacts a reduction of nitrogen oxides $NO_x$ in said exhaust stream, through the use of said first additive in at least one first reduction catalyst device, arranged downstream of said first dosage device, wherein said first reduction catalyst device carries out a first reduction of a first amount of said nitrogen oxides $NO_{x\_1}$ reaching said first reduction catalyst device; and catching and oxidizing of soot particles, and oxidizing of one or several of nitrogen oxide NO and incompletely oxidized carbon compounds in said exhaust stream, through the use of a particulate filter, at least partly comprising a catalytically oxidizing coating, which is arranged downstream of said first reduction catalyst device; and controlling supply of a second additive into said exhaust stream through the use of a second dosage device, arranged downstream of said particulate filter, wherein said supply of said second additive impacts a reduction of nitrogen oxides $NO_x$ in said exhaust stream, through the use of at least one of said first and said second additive in a second reduction catalyst device, arranged downstream of said second dosage device, wherein said second reduction catalyst device carries out a second reduction of a second amount of said nitrogen oxides $NO_{x\_2}$ reaching said second reduction catalyst device, wherein an adaptation is carried out of a ratio $NO_{2\_2}/NO_{x\_2}$, where $NO_{2\_2}$ is an amount of nitrogen dioxide in said exhaust stream reaching said second reduction catalyst device and $NO_{x\_2}$ is said second amount of said nitrogen oxides in said exhaust stream reaching said second reduction catalyst device, wherein an active control of said first reduction of said first amount of nitrogen oxides $NO_{x\_1}$ is carried out, based on a value for said ratio $NO_{2\_2}/NO_{x\_2}$.

* * * * *

UNITED STATES PATENT AND TRADEMARK OFFICE
CERTIFICATE OF CORRECTION

PATENT NO. : 10,054,023 B2
APPLICATION NO. : 15/314441
DATED : August 21, 2018
INVENTOR(S) : Nilsson et al.

It is certified that error appears in the above-identified patent and that said Letters Patent is hereby corrected as shown below:

On the Title Page

Item (72):
Inventors: Magnus Nilsson, Ärsta (SE)
Should be:
Inventors: Magnus Nilsson, Årsta (SE)

Signed and Sealed this
Second Day of October, 2018

Andrei Iancu
*Director of the United States Patent and Trademark Office*